United States Patent [19]
Greene

[11] Patent Number: 5,838,377
[45] Date of Patent: Nov. 17, 1998

[54] VIDEO COMPRESSED CIRCUIT USING RECURSIVE WAVELET FILTERING

[75] Inventor: Richard Greene, Austin, Tex.

[73] Assignee: Analog Devices, Inc., Norwood, Mass.

[21] Appl. No.: 777,705

[22] Filed: Dec. 20, 1996

[51] Int. Cl.$^6$ .................................................. H04N 7/30
[52] U.S. Cl. .......................................... 348/398; 348/403
[58] Field of Search .................................... 348/398, 397, 348/403, 404, 390, 384; 364/715.02; 382/249, 248, 232; H04N 7/133

[56] References Cited

U.S. PATENT DOCUMENTS

| | | | |
|---|---|---|---|
| 4,447,886 | 5/1984 | Meeker | 364/725 |
| 4,974,187 | 11/1990 | Lawton | 364/728 |
| 4,987,480 | 1/1991 | Lippman | 348/396 |
| 5,014,134 | 5/1991 | Lawton et al. | 358/261 |
| 5,048,111 | 9/1991 | Jones et al. | 382/56 |
| 5,049,990 | 9/1991 | Kondo et al. | 358/133 |
| 5,067,015 | 11/1991 | Combridge et al. | 358/133 |
| 5,068,911 | 11/1991 | Resnikoff et al. | 382/56 |
| 5,101,446 | 3/1992 | Resnikoff et al. | 382/56 |
| 5,121,216 | 6/1992 | Chen et al. | 358/261 |
| 5,142,360 | 8/1992 | Niihara | 358/105 |
| 5,148,498 | 9/1992 | Resnikoff et al. | 382/54 |
| 5,206,723 | 4/1993 | Parke | 358/105 |
| 5,227,875 | 7/1993 | Suu et al. | 358/133 |
| 5,272,529 | 12/1993 | Frederiksen | 358/133 |
| 5,272,530 | 12/1993 | Cassereau | 358/136 |
| 5,276,513 | 1/1994 | van der Wal et al. | 358/136 |
| 5,309,232 | 5/1994 | Hartung et al. | 348/384 |
| 5,321,776 | 6/1994 | Shapiro | 382/56 |
| 5,351,086 | 9/1994 | Park | 348/402 |
| 5,412,741 | 5/1995 | Shapiro | 382/232 |
| 5,420,636 | 5/1995 | Kojima | 348/403 |
| 5,442,399 | 8/1995 | Asamura et al. | 348/394 |
| 5,446,495 | 8/1995 | Tourtier et al. | 348/398 |
| 5,477,272 | 12/1995 | Zhang et al. | 348/407 |
| 5,495,292 | 2/1996 | Zhang et al. | 348/407 |
| 5,563,960 | 10/1996 | Shapiro | 382/239 |
| 5,602,589 | 2/1997 | Vishwanath et al. | 348/398 |

FOREIGN PATENT DOCUMENTS

| | | | |
|---|---|---|---|
| 0 176 243 A2 | 4/1986 | European Pat. Off. | H04B 1/66 |
| WO 92/2298 | 12/1992 | WIPO | H04N 7/13 |
| WO 93/09637 | 5/1993 | WIPO | H04N 7/13 |

OTHER PUBLICATIONS

Scene Adaptive Coder, Wen–Hsiung Chen and William K. Pratt, IEEE Transactions on Communications, vol. COM. 32, No. 3, pp. 225–232, Mar. 1984.

The Wavelet Transform, Time–Frequency Localization and Signal Analysis, Ingrid Daubechies, IEEE Transactions on Information Theory, vol. 36, No. 5, pp. 961–1005, Sep. 1990.

A Theory for Multiresolution Signal Decomposition: The Wavelet Representation, Stephane G. Mallat, IEEE Transactions on Pattern Analysis and Machine Intellegence, vol. 11, No. 7, pp. 674–693, Jul. 1989.

Interpolative Multiresolution Coding of Advanced Television with Compatible Subchannels, K.M. Uz, M. Vetterli & D.J. LeGall, IEEE Transactions on Circuits and Systems for Video Technology, vol. 1, No. 1, Mar. 1991.

Subband Coding of Images, John W. Woods and Sean D. O'Neil, IEEE Transactions on Acoustics, Speech and Signal Processing, vol. ASSP.34, No. 5, Oct. 1986.

(List continued on next page.)

*Primary Examiner*—Bryan Tung
*Attorney, Agent, or Firm*—Wolf, Greenfield & Sacks, P.C.

[57] ABSTRACT

A video compression circuit comprises an input that receives an input video signal. A memory buffer, coupled to the input, temporarily stores a portion of the input video signal. A single horizontal filter bank, coupled to the memory buffer, high-pass and low-pass filters horizontal components of the input video signal. A single vertical filter bank, also coupled to the memory buffer, high-pass and low-pass filters vertical components of the input video signal. A recursion buffer, coupled to the filter banks, temporarily stores filter components of the input video signal for recursive filtering.

16 Claims, 13 Drawing Sheets

OTHER PUBLICATIONS

Digital Signal Processing I, ICASSP–92, vol. 4, D1, 1992, Jerome M. Shipiro, IEEE International Conference on Speech and Signal Processing, Mar. 23–26, 1992.

FPM 21.1 Predictive Block–Matching Motion Estimation Schemes for Video Compression (Digest), ZaFar, et al., IEEE 1991 International Conference on Consumer Electronics, pp. 300–301, Jun. 5–7, 1991.

The Laplacian Pyramid as a Compact Image Code, Peter J. Burt and Edward H. Adelson, IEEE Transactions on Communications, vol. COM–31, No. 4, pp. 532–540, Apr. 1983.

Compression of Two Dimensional Data, Abraham Lempel and Jacob Ziv, IEEE Transactions on Information Theory, vol. IT–32, No. 1, Jan. 1986.

Multifrequency Channel Decompositions of Images and Wavelet Models, Stephane G. Mallat, IEEE Transactions on Acoustics, Speech and Signal Processing, vol. 37, No. 12, pp. 2091–2110, Dec. 1989.

Multiresolution Techniques for Image Representation, Analysis, and 'Smart' Transmission, Peter Burt, SPIE vol. 1199 Visual Communications and Image Processing IV (1989), pp. 2–15.

An Introduction to Arithmetic Coding, Glen G. Langdon, Jr., IBM J. Res. Develop., vol. 28, No. 2, pp. 135–149, Mar. 1984.

Orthogonal Pyramid Transforms for Image Coding, E.H. Adelson and E. Simoncelli, SPIE, vol. 845, Visual Communication and Image Processing II (1987), pp. 50–58.

Arithmetic Coding for Data Compression, I.H. Witten, R.M. Neal and J.G. Cleary, Communications of the ACM, vol. 30, No. 6, pp. 520–540, Jun. 1987.

** MAY BE RECURSED

VIDEO COMPRESSED CIRCUIT USING RECURSIVE WAVELET FILTERING

FIELD OF THE INVENTION

The present invention generally relates to data compression technology and, more specifically, to a video compression system utilizing a two-dimensional, bi-orthogonal, wavelet-based transformation scheme. Significant video image system memory and bandwidth savings can be realized through use of the invention.

BACKGROUND OF THE INVENTION

Data compression techniques aim to enable information to be represented as accurately as possible with a reduced amount of data (i.e., fewer bits compared to the original data). By reducing the number of bits required to be transmitted and stored by information transmission/storage systems, data compression techniques greatly reduce memory size and bandwidth (i.e., bus widths, etc.) requirements of such systems. Additionally, information recovery speed can be increased. There are many types of data compression techniques. Broadly, all data compression techniques fall into one of two categories: lossless (i.e., information preserving) and lossy. Lossy techniques can reproduce the original only imperfectly, but the loss in accuracy of reproduction may be made quite small.

One class of data compression techniques which can be used for both lossy and lossless compression implements a mathematical transform to translate a time-domain input signal to the frequency domain, thus revealing the signal's spectral components from the known temporal components. In implementing the transform, filters commonly are employed to break down the input signal into multiple frequency bands, each band having at least a portion of the information needed to reconstruct the input signal. Most approaches then remove redundant and unneeded data present among the multiple frequency bands. Various transformers are employed, depending on factors such as the type of signal being compressed, the amount of compression needed, the available processing capability and the required reproduction fidelity.

A well-known basic time/frequency transform called Fourier Transform (FT), uses orthonormal basis functions of sine and cosine waveform to provide a frequency domain representation of a time domain function. The FT technique is not well-suited for lossless video or image compression, though. Because the basis sine and cosine signals are boundless (they ideally extend infinitely in each direction), the FT works under the assumption that the original time-domain function is periodic in nature. The FT, as a result, does not accurately translate functions having transient components localized in time (i.e., signals, such as video signals, having sharp transitions). This is so because the FT frequency domain spectrum does not explicitly show the time localization of frequency components of an input function, necessary for efficient compression of input functions having transients.

While such a time localization can be obtained by suitably pre-windowing an input signal, as is done in Short-Time FT (STFT), an inherent limitation in the STFT results in a time resolution/frequency resolution tradeoff and poor discretized breakdown and reconstruction of input signals. The Gabor expansion to the STFT enables improved discretized breakdown and reconstruction of signals by using basis signals that are well localized and concentrated in time and frequency, but requires use of accurate, multi-tap, expensive filters to produce the FT frequency plot.

Discrete Cosine Transform (DCT) compression schemes, commonly used with JPEG, MPEG and H.261 video formats, do not correlate well to the broad-band nature of video images due to the use of sinusoidal reference (basis) signals. In addition, DCT compression schemes require an image to be broken down into sub-blocks for filtering and suffer from image degradation at high compression ratios due to block artifacts ("the block effect"). Other compression techniques, such as those utilizing Gaussian and Laplacian transforms, while able to yield considerable compression due to the removal of substantial redundancies among frequency sub-bands, cannot very accurately reproduce the original signal also due to such drawbacks as the "block effect". Such techniques, therefore, also are not well-suited for lossless video or image compression applications which are the principal application of the present invention.

Recently, the use of wavelet transforms has received considerable attention because, by contrast with the aforementioned techniques, their properties make them well-suited for lossless video and image compression applications. Due at least in part to the bound nature of the reference wavelet basis, as well as to the orthoganality of the wavelet basis at different frequency scales, near-perfect reconstruction of a compressed video signal can be achieved. In addition, relatively simple and compact filter banks can be constructed to implement the ("near perfect") wavelet-based decomposition/reconstruction.

Typically, during wavelet-based decomposition, a frequency band of an image signal is decomposed into a number of sub-bands by a bank of bandpass filters. Each sub-band then is translated to a lower frequency band (baseband, for example) by decimating (down-sampling) it and thereafter encoding it. During reconstruction, each encoded sub-band is decoded and then interpolated (up-sampled) back to its original frequency band. The bands then are summed to provide a replica of the original image signal.

The Mallat version of the wavelet transform enables two-dimensional decomposition/reconstruction. Due to the recursive (to achieve the multi-sub-band plot) nature of the wavelet transform, however, a considerable amount of buffer memory may be required to store temporarily information in the filter pipeline. Additionally, due to the mathematical properties of the wavelet basis and transform, most prior art approaches to wavelet-based video image compression have been implemented in software.

It is a general object of the present invention to provide a simple, yet accurate, lossless wavelet-based video image compression technique that requires a minimal amount of buffer memory and is implementable in hardware, preferably on a single monolithic substrate.

SUMMARY

The present invention is directed to a two-dimensional, wavelet-based video image compression technique that is implementable in a single, inexpensive monolithic integrated circuit (IC). The technique supports standard digital video having a range of field and frame sizes and rates and provides accurate decomposition (analysis)/reconstruction (synthesis) in computer, PAL, NTSC, or still image environments.

In an embodiment of the invention, after an initial buffer period, both horizontal and vertical video data are processed in real-time by common filter banks. Each portion of a field of video data is processed separately at one time, requiring a minimal amount of buffer memory. In addition, the same filter banks are used both for analysis and synthesis and high-pass and low-pass filtering.

The compression technique, according to one embodiment of the invention, dynamically and recursively implements a bi-orthogonal (7, 9) wavelet transform in two dimensions on an input video data stream. High-pass and low-pass filtering simultaneously is carried out to achieve a desired two-dimensional, multi-sub-band frequency plot.

In one embodiment, a video compression circuit includes an input that receives an input video signal. A memory buffer, coupled to the input, temporarily stores a portion of the input video signal. A signal horizontal filter bank, coupled to the memory, high-pass and low-pass filters horizontal components of the input video signal. A single vertical filter bank, coupled to the memory buffer, high-pass and low-pass filters vertical components of the input video signal.

In an embodiment of the invention, the circuit further includes a recursion buffer, coupled to the horizontal filter bank and the vertical filter bank, that temporarily stores filtered components of the input video signal for recursive filtering.

A further embodiment of the invention is directed to a method for compressing an input video signal comprising the steps of: receiving the input video signal; storing a portion of the input video signal; with a single horizontal filter bank, high-pass and low-pass filtering horizontal components of the input video signal; and with a single vertical filter bank, high-pass and low-pass filtering vertical components of the input video signal.

In an embodiment, the method further includes the step of recursively filtering filtered components of the input video signal with the horizontal and vertical filter banks.

Lossless compression can be achieved with a 4:1 compression ratio for natural images and a peak compression ratio of 350 to 1 can be achieved with the technique of the present invention. In addition, at 30 to 1, using the compression technique of the invention, 25 minutes of video data can be stored on a 1 Giga-byte-sized drive.

DETAILED DESCRIPTION

A video/image compression technique of the present invention includes a bi-orthogonal, two-dimensional, Wavelet-based transformation scheme. Both analysis and synthesis and high-pass filtering and low-pass filtering are performed by the same filter banks. Each of a series of small portions (fields) of a frame of video data is separately and consecutively filtered, enabling use of a minimal amount of buffer memory.

The term "wavelet" applies to a sequence of data points that may be used as a basis function for any data stream. This "wavelet" has a very beneficial property known as "compact support". This means that the sequence starts and ends with zeros, rather than extending infinitely in the positive and negative direction (like the cosine function—the basis function used in Fourier analysis). When using cosine basis functions, small changes in frequency will ripple across the entire time domain due to the infinite nature of the cosine function. In wavelet analysis, the basis functions may be scaled, translated, and dilated to perfectly construct any signal.

Wavelet Transform

Figure 1:
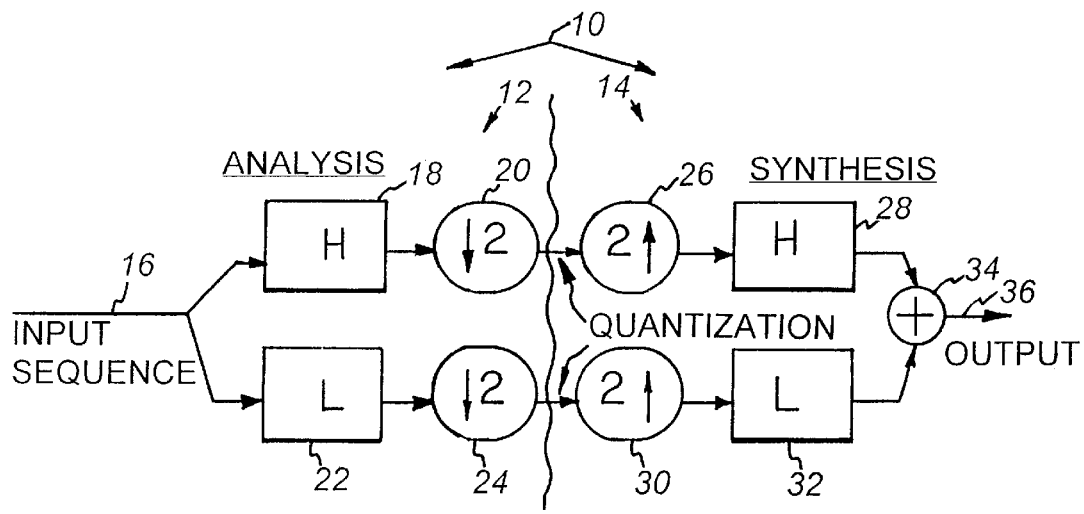
FIG. 1 is block diagram of an orthogonal, wavelet-based, analysis/synthesis filter system.

FIG. 1 is a high-level block diagram showing an orthogonal, wavelet-based filter scheme. As shown, digital input image signal is received on bus 16 and is high-pass filtered by digital high-pass filter 18 and low-pass filtered by digital low-pass filter 22. The filtered images are decimated (down sampled) by two by decimators 20 and 24, respectively. Thus, a first sub-band signal is produced by high-pass filter 18 and then translated to a lower frequency band (V2 of the original) by decimator 20. A second sub-band signal is produced by low-pass filter 22 and then translated to a lower frequency band by decimator 24. The sub-band signals then can be input through the system once again and recursively filtered to produce further sub-band signals. This portion 12 of the system performs the analysis (decomposition) of the video image.

As shown, the method for performing a single-level one-dimensional discrete wavelet transform involves generating two output sequences from the input sequence: a low-pass and a high-pass sequence. Each of these sequences contains half the number of points in the original sequence. This process is known as analysis, as much of the original sequence has been retained in the low-pass sequence, while the details (i.e. edge information) has been retained in the high-pass sequence. Together, these sequences can be used to restore the original sequence in its exact form (Perfect Reconstruction Property).

Portion 14 of the system performs the synthesis (reconstruction) of the original image from the sub-band signals. During synthesis, each sub-band is interpolated (up-sampled) by a factor of two (back to the original frequency band of the input signal) by respective interpolators 26 and 30. The up-sampled image sub-band signals then are respectively high-pass filtered by high-pass filter 28 and low-pass filtered by low-pass filter 32. The interpolated and filtered images then are combined by adder 34 to reconstruct a decompressed replica of the original image which is output on bus 36.

The synthesis process involves interpolating the two sequences up by two, and running them through the same FIR wavelet filter banks that were used for analysis. The two results then are summed to generate the original input sequence. All the filter banks used in this process are taken from a single set of coefficients that defines the wavelet basis (also called the "mother wavelet"). To obtain the high-pass coefficients, the odd coefficients are inverted. This utilization of a single "mother wavelet" is known as an "orthogonal" wavelet system, and is illustrated in FIG. 1.

After the analysis stage, the transformed data is now in a format that can be compressed due to the generation of many zeroes in the high-pass sequence. Also, the high-pass data contains edge information about the input sequence which can be exploited for many signal processing applications.

The filters typically are digital filters (such as finite impulse response FIR filters) which ideally are linear and require a small number of taps. In a 7,9 Wavelet-based filter, for example, each of high-pass filter 18 and low-pass filter 32 has 7 taps and each of low-pass filter 22 and high-pass filter 28 has 9 taps.

In between the analysis and synthesis sections, the intermediate results may be quantized to further add to the compression of these data streams; the more quantization that occurs, the more lossy the final result will be. It is important to realize that the system of the invention can perform lossless compression (no quantization), and lossy compression with a desired level of loss. After obtaining certain statistics of the transformed sequences (e.g. sum-of-squares), quantization factors can be derived that can attain either a desired level of quality with optimal compression, or a desired level of compression with optimal quality.

A major disadvantage to orthogonal wavelet-based systems is that each filter is asymmetric, and therefore non-linear (except for the Haar wavelet which is a length two wavelet which does not offer certain key benefits of the larger length wavelet filter banks). The only way to obtain symmetry with orthogonal wavelets is to relinquish compact support which typically is unacceptable due to the computation burden it requires (very large length filters).

The bi-orthogonal wavelet-based system avoids the aforementioned drawbacks associated with orthogonal wavelet-based systems. With bi-orthogonal wavelet-based systems, two wavelet basis functions are used symbiotically in the system, and together they allow for perfect reconstruction with linear filters, and compact support. The two basis functions in a bi-orthogonal wavelet pair also can have different lengths. The tap length of biorthogonal wavelet filter banks can be as small or large as desired. For example, it has been determined that a 9,7 filter pair derived by Barlaud has many advantages for use in an image compression algorithm. Its computational requirements are low, while providing reasonable spectral separation between the low pass sequence L and the high pass sequence H (for video data). This characteristic allows for good compression capability.

Figure 2:
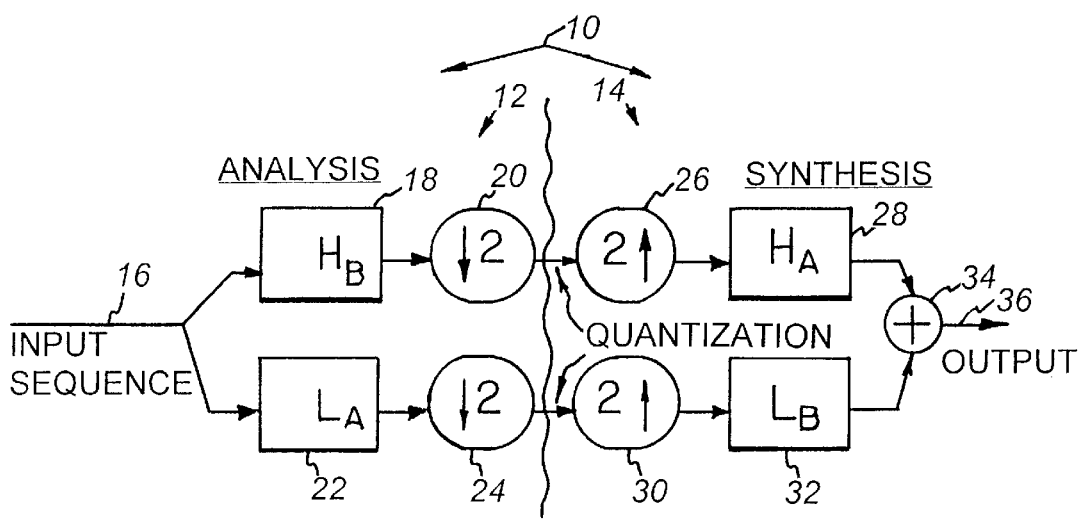
FIG. 2 is a block diagram of a bi-orthogonal, wavelet-based analysis/synthesis filter system.

A bi-orthogonal wavelet-based transform system is shown in FIG. 2, where like reference characters denote similar elements. The system shown in FIG. 2 operates similarly to that shown in FIG. 1. The relationship between filters 18 and 32 and between filters 22 and 38 are somewhat different, however. For each path (low-pass and high-pass), each of the "mother wavelets" is utilized (one in the analysis, and the other in synthesis). There are a total of four filter banks, with some similarities among them (the H filter banks are derived from their respective L filter with the odd coefficients negated). All four filter banks are symmetrical, and are compactly supported.

As described below, one embodiment of the invention is directed to a biorthogonal wavelet-based transform system used for video compression. A 9-tap wavelet basis will be described. It should be appreciated, however, that the mathematics can be extended to higher odd-lengthed wavelets, envisioned to be within the scope of the invention. First, a simple form for the transform equation that can be used for all four of the filter banks will be derived.

Equation Derivations

Analysis Equations

The basic equations for a 9-tap wavelet-based analysis filter (assuming polarity of coefficients) for low-pass $L_0$ and high-pass $H_0$ filtering respectively are:

$L_0 = a_4(d_{-4}+d_4) + a_3(d_{-3}+d_3) + a_2(d_{-2}+d_2) + a_1(d_{-1}+d_1) + a_0 d_0$ $H_0 = b_4(d_{-4}+d_4) + b_3(d_{-3}+d_3) + b_2(d_{-2}+d_2) + b_1(d_{-1}+d_1) + b_0 d_0$ wherein $a_4$, $a_3$, $a_2$, $a_1$, $a_0$ represent the low-pass filter coefficients, $b_4$, $b_3$, $b_2$, $b_1$, $b_0$ represent the high-pass filter coefficients and $d_{-4}$, $d_4$, $d_{-3}$, $d_3$, $d_{-2}$, $d_2$, $d_{-1}$, $d_1$ and $d_0$ represent the input video data points to be filtered. It should be appreciated that the above equations representing the low-pass filtering and high-pass filtering have been simplified due to the symmetry of the coefficients about the 0 tap of a digital FIR filter.

Due to the symmetry of the wavelet basis resulting in every other filter coefficient summing to one (i.e., $2a_4+2a_2+a_0=1$), the following substitutions were made by Applicants to the above equations:

$$a_4 = \frac{(1-a_0)}{2} - a_2 \quad b_4 = \frac{(1-b_0)}{2} + b_2$$

-continued $$a_3 = \frac{1}{2} - a_1 \quad b_3 = \frac{1}{2} - b_1$$

Rewritten equations become:

$$L_0 = a_0\left(-\frac{d_{-4} + d_4}{2} + d_0\right) + a_1(-d_{-3} + d_{-1} + d_1 - d_{-3}) +$$

$$a_2(d_{-4} + d_{-2} + d_2 - d_4) + \frac{d_{-4} + d_{-3} + d_3 + d_4}{2}$$

and $$H_0 = b_0\left(-\frac{d_{-4} + d_4}{2} + d_0\right) + b_1(-d_{-3} + d_{-1} + d_1 - d_{-3}) +$$

$$a_2(d_{-4} + d_{-2} + d_2 - d_4) + \frac{d_{-4} + d_{-3} + d_3 + d_4}{2}.$$

The only differences between the high-pass and low-pass equations above are (1) $-b_1$ instead of $b_1$, and (2) $-d_{-3}-d_3$ in the final term instead of $+d_{-3}+d_3$. Therefore, as will be described in more detail below, the high-pass and low-pass filtering can be implemented with the same filter bank hardware.

Also, for all data streams in the analysis, the L equation is used to generate even-indexed outputs, and the H equation is used for the odd indexed outputs. This inherently causes the L and H output data streams to be decimated by 2 (since each is done only half of the time) and the equation is processed once for every point in the data stream.

Figure 3:
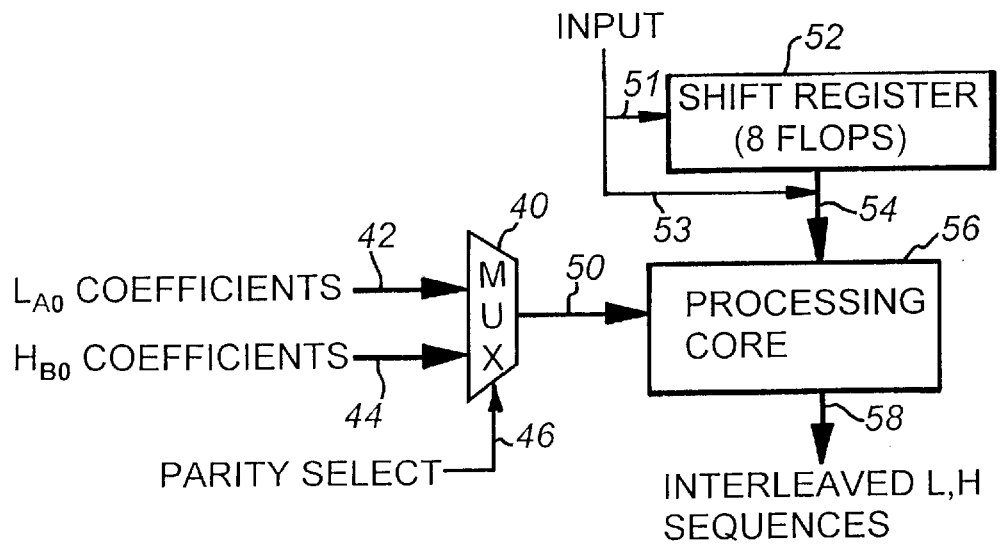
FIG. 3 is a block diagram of a single level wavelet-based analysis system.

FIG. 3 is a block diagram of a single-level analysis system. As shown, the system includes a shift register 52 (which may consist of eight flip-flops), a processing core 56 (consisting of the filter banks) and a multiplexer which selects from the high-pass and low-pass filter coefficients to pass to the processing core. An input is received on bus 51 and is provided to shift register 52 which provides a shifted output on bus 54 to processing core 56. The input also is provided on bus 53 to bus 54 and to the processing core. Multiplexer 4 receives low-pass filter coefficients on bus 42 and high-pass filter coefficients on bus 44. A Parity Select signal is received by multiplexer 40 on bus 46 and controls operation of multiplexer 40.

The Parity Select is a single bit that toggles after each sample taken by the processing core and bit shifted into the shift register. Note that no compression has been performed during this process (i.e. the number of output samples is equal to the number of input samples). Also note that so long as the processing core can take a new input sample on each clock cycle, the core must run at the input sampling frequency to keep up in real-time. It will be shown below that the core must run at a rate of at least twice the input sampling frequency to perform real-time multi-level wavelet transforms required for video compression.

Synthesis Equations

The synthesis processing involves interpolating both the L and H sequences by 2, convolving each with their respective filter bank, and then summing the resultant two output sequences. The filter equations for high-pass H and low-pass L are as follows:

$$L_0 = b_4(d_{-4}+d_4) + b_3(d_{-3}+d_3) + b_2(d_{-2}+d_2) + b_1(d_{-1}+d_1) + b_0 d_0 \quad \text{(EQ5)}$$

$$H_0 = a_4(d_{-4}+d_4) - a_3(d_{-3}+d_3) + a_2(d_{-2}+d_2) - a_1(d_{-1}+d_1) + a_0 d_0$$

Since each sequence is interpolated by two (by inserting a zero after each sample, for example), the above equations can be simplified by only using the terms necessary. Also, the L and H sequences can be interleaved, and the equations combined, thus performing both the filter and sum operations at the same time. There are two cases of interleaving that must be considered:

$l_0 h_0 l_1 h_1 l_2 h_2 l_3 h_3 \ldots$ (even case)

$h_0 l_1 h_1 l_2 h_2 l_3 l_3 l_4 \ldots$ (odd case)

Even Case

The following table illustrates how the interleaving can be performed for the even case 9-tap filter banks, with the filtering and summing operations being done simultaneously.

| d-5 | d-4 | d-3 | d-2 | d-1 | d0 | d1 | d2 | d3 | d4 | d5 | DATA MAP |
|---|---|---|---|---|---|---|---|---|---|---|---|
| 0 | L0 | 0 | L1 | 0 | L2 | 0 | L3 | 0 | L4 | 0 | LOW |
| H-1 | 0 | H0 | 0 | H1 | 0 | H2 | 0 | H3 | 0 | H4 | HIGH |
| 0 | b4 | b3 | b2 | b1 | b0 | b1 | b2 | b3 | b4 | 0 | LB |
| 0 | a4 | −a3 | a2 | −a1 | a0 | −a1 | a2 | −a3 | a4 | 0 | HA |
| 0 | b4L0 | −a3H0 | b2L1 | −a1H1 | b0L2 | −a1H2 | b2L3 | −a3H3 | b4L4 | 0 | SUM |

The first row of the table contains the actual sample index when considering the interleaved input pattern as a single sequence of data. This substitution (for the L and H terms) can be made later. The sum can now be represented as:

$$b_4(L_0+L_4) + b_2(L_1+L_3) + b_0 L_2 - a_3(H_0+H_3) - a_1(H_1+H_2) \quad \text{(EQ6)}$$

Substituting for b4 and a3 from the equations (listed above) resulting from the symmetry of the wavelet basis, and also substituting the interleaved data terms for the L and H terms will result in the following more simplified equation:

$$\text{EVEN} = b_0\left(-\frac{d_{-4} + d_4}{2} + d_0\right) - a_1(-d_{-3} + d_{-1} + d_1 - d_3) + \quad \text{(EQ 7)}$$

$$b_2(-d_{-4} + d_{-2} + d_2 - d_4) + \frac{d_{-4} - d_{-3} - d_3 + d_4}{2}$$

This equation is nearly identical to the simplified analysis level high-pass equation H listed above, with the only exception being replacing b1 with a1.

Odd Case

The odd case can be handled in the same manner as the even case. For this case, however, both the L and H terms will be shifted to the left by 1 position.

| d-5 | d-4 | d-3 | d-2 | d-1 | d0 | d1 | d2 | d3 | d4 | d5 | DATA MAP |
|---|---|---|---|---|---|---|---|---|---|---|---|
| L0 | 0 | L1 | 0 | L2 | 0 | L3 | 0 | L4 | 0 | L5 | LOW |
| 0 | H0 | 0 | H1 | 0 | H2 | 0 | H3 | 0 | H4 | 0 | HIGH |
| 0 | b4 | b3 | b2 | b1 | b0 | b1 | b2 | b3 | b4 | 0 | LB |
| 0 | a4 | −a3 | a2 | −a1 | a0 | −a1 | a2 | −a3 | a4 | 0 | HA |
| 0 | a4H0 | b3L1 | a2H1 | b1L2 | a0H2 | b1L3 | a2H3 | b3L4 | a4H4 | 0 | SUM |

The sum can now be represented as:

$$a_4(H_0+H_4)+a_2(H_1+H_3)+a_0H_2+b_3(L_1+L_4)+b_1(L_2+L_3) \qquad (EQ8)$$

Substituting for a4 and b3 from the equations listed above representing the symmetry in the wavelet basis results in the following equation:

$$\text{ODD} = a_0\left(-\frac{d_{-4}+d_4}{2}+d_0\right)+b_1(-d_{-3}+d_{-1}+d_1-d_3)+ \qquad (EQ9)$$

-continued $$a_2(-d_{-4}+d_{-2}+d_2-d_4)+\frac{d_{-4}+d_{-3}+d_3+d_4}{2}$$

This equation is nearly identical to the above-listed analysis level low-pass filter equation L, with the only exception being replacing a1 with b1.

Figure 4:
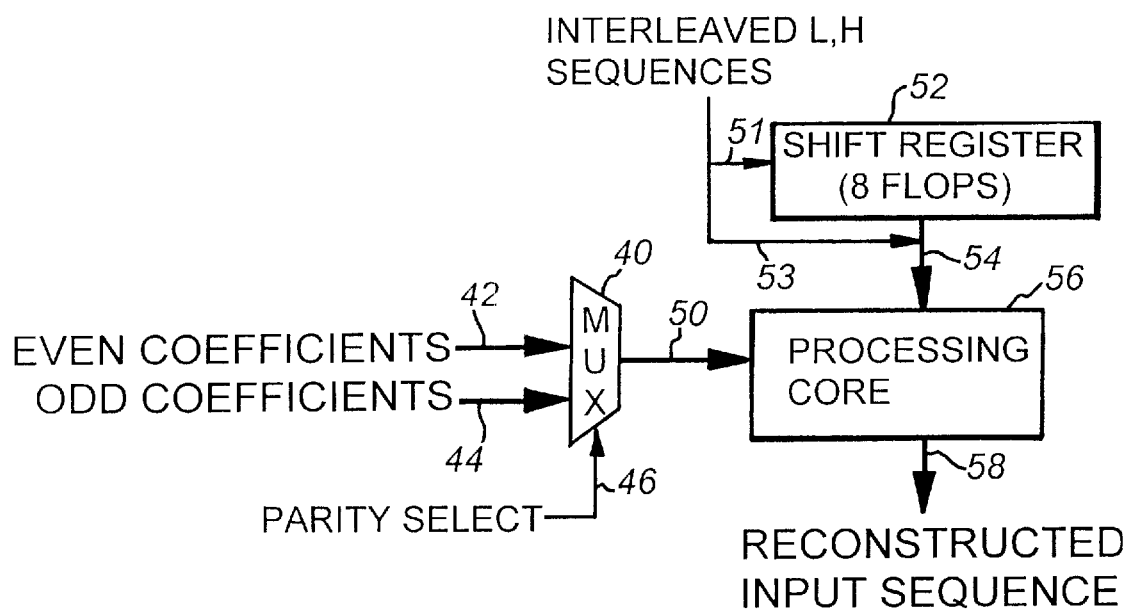
FIG. 4 is a block diagram of a single level wavelet-based synthesis system.

It should be appreciated, therefore, that the same equation may be used to represent all of the filter banks illustrated in FIG. 2. Shown in FIG. 4 is a block diagram of a single-level, wavelet-based synthesis filter system, wherein like reference characters are used to denote similar elements to that of FIG. 3. Because of the similarity in structure and operation of the system to that shown in FIG. 3, it will not be described in detail. The processing core 56 is the same for both analysis and synthesis. Note that in the synthesis case, the Parity Select signal causes the multiplexer 40 to select between even and odd coefficients rather than low-pass and high-pass coefficients.

It should now be appreciated how the same architecture can be used to perform either analysis or synthesis.

Edge Mirroring

For the sake of completeness, the concept and implementation of edge-mirroring must be presented as it does pertain to the nature of the wavelet equations.

In a standard linear (i.e. symmetrical) FIR filter implementation, the center tap is considered as time zero (for even-length filters, either of the center two taps may be considered as time zero). In other words, the index for the data value that is being multiplied by the center tap is also the index for the resultant output sequence. This has been illustrated in this document by using a[0] or b[0] as the center taps for each of the filters.

The repercussion of this is that the first output point can only be derived once the first input point is shifted into the center position. For a 9-tap filter, this would require a latency of five clock cycles to shift the first five samples into the shift register. Unfortunately, the four shift registers after the center tap are still zero, which would lead to an improperly scaled result! To avoid this problem, the first (and last) four samples are mirrored in the shift register as they are shifted in. For example, if the first five samples are d[0], d[1], d[2], d[3], and d[4], the first output sample will be calculated when the following values are loaded into the shift register:

| d[4] | d[3] | d[2] | d[1] | d[0] | d[1] | d[2] | d[3] | d[4] |
|---|---|---|---|---|---|---|---|---|

Likewise, the last four samples in a sequence are mirrored. For example, for a 100 sample input sequence (index 99 is last), then the last output sample (99) will be calculated with the following values loaded into the shift register:

| d[95] | d[96] | d[97] | d[98] | d[99] | d[98] | d[97] | d[96] | d[95] |
|---|---|---|---|---|---|---|---|---|

The samples in boldface are the mirrored samples.

In sum, when processing a single-dimensional sequence through a 9-tap wavelet filter bank, the first output result is calculated with the fifth input sample. The last four output samples are obtained by reverse mirroring the last four input samples one at a time. Note that this statement also pertains to the interleaved synthesis equations.

In many circumstances, edge-mirroring is not a necessity for single-dimensional data streams. In this case, for a n-tap filter, the nth output result will be the first valid result. For many applications (e.g. audio, communications), this is not a problem. But for video processing where every pixel is crucial (including the edge pixels), this is not acceptable, requiring the use of edge-mirroring.

Wavelet Transform Processor Datapath

Figure 5:
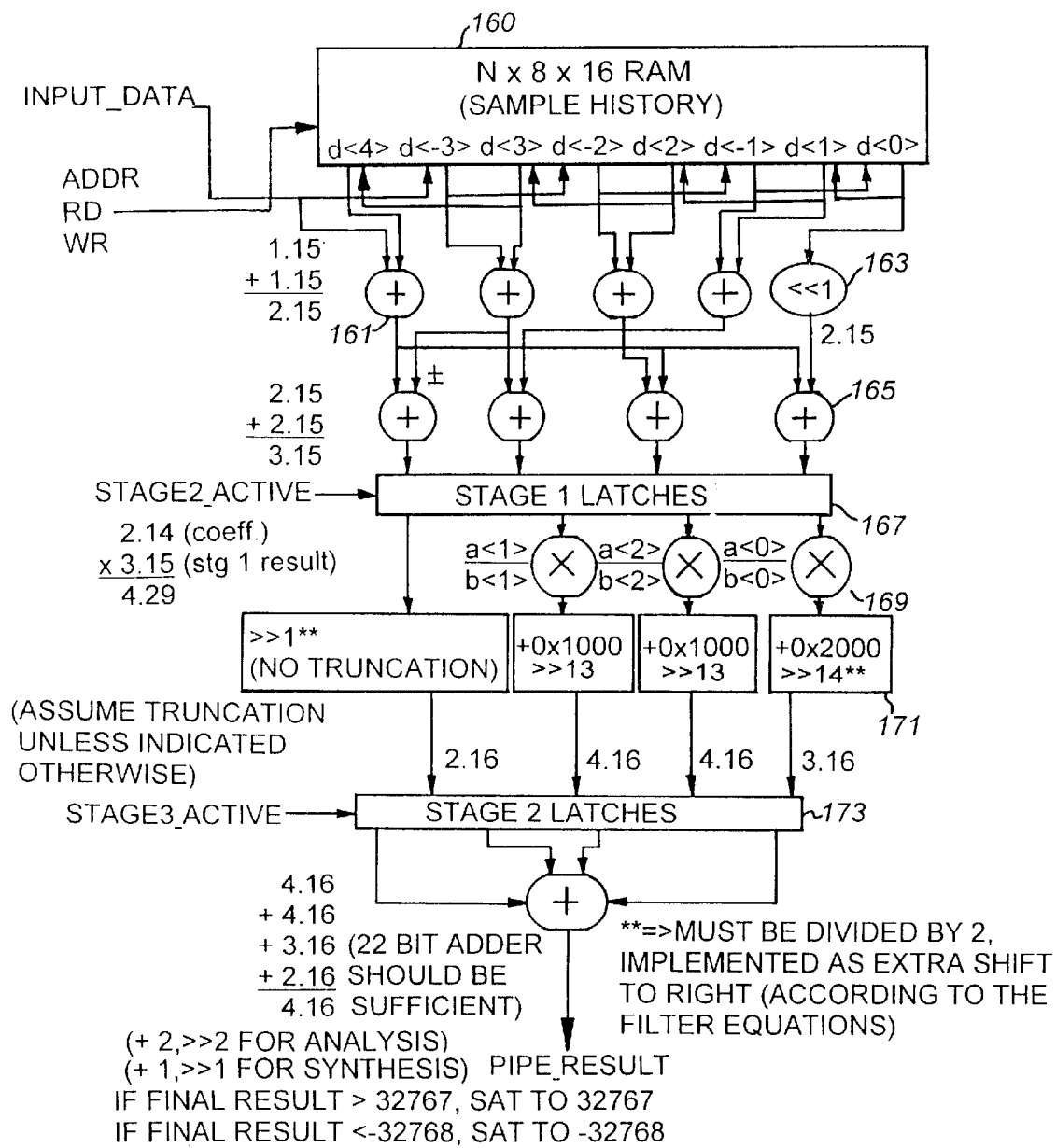
FIG. 5 is a part functional, part structural block diagram of a one-dimensional wavelet-based filter bank (either horizontal or vertical) according to the present invention.

FIG. 5 is a part functional, part structural block diagram of one filter bank (either horizontal or vertical) according to the present invention. Each bank has the following four-stage operational pipeline: 1) memory read/modify write; 2) add; 3) multiply; 4) accumulate, as described in more detail below. The total latency through the pipeline thus is four cycles. Both analysis and synthesis on N data streams are performed by the same filter bank. Also, both high-pass filtering and low-pass filtering are performed by the same filter bank. Equations representing the filtering required for analysis and synthesis and high-pass filtering and low-pass filtering were simplified by the Applicants herein (as described above) such that a common filter bank could be used to perform all operations. Operation of each of the four stages of the pipeline is described separately below.

RAM Stage (FIR Sample Window Storage/Shifter)

In the illustrative embodiment shown, the RAM 160 in this stage stores the last eight samples of the data stream. Along with the newest sample of the stream, all nine samples in the FIR window are latched for the next stage of the pipe. In order to support multiple data stream processing using a single datapath, this RAM can be of any arbitrary size (in multiples of eight samples).

The basic function performed in this stage is a READ operation of the eight samples, latching the eight output samples and the input sample. In the same cycle, the RAM is then written back with the shifted samples in order to be ready for the next newest sample. The scheme may be summarized as such (for stream N) by the following psuedocode (written in C software programming language):

```
for (I=0; i<8; I++)
    d[i] = RAM[8*N+I];
for (I=7; i>0; i--)
    RAM[8*N+I] = RAM[8*N+I-1];
RAM[8*N] = new_d;
```

Since the address of the RAM is the same for both the READ and WRITE operations, only a single pre-charge cycle is necessary. The cycle must be divided into the three following sections: pre-charge, read, and write-back. In one embodiment, each cycle is divided into 16 sections. For this operation, the precharge uses seven sections, the READ uses five sections, and the WRITE uses the remaining four sections.

To accommodate the edge-mirroring, the shifting algorithm must be enhanced for the first five and last four samples in the data stream. For the first five samples, the algorithm is essentially the same, except that the newest sample is also loaded in another position of the output latches (rather than the RAM output) prior to the write-back. The sample numbers in the nine history positions (−4 to 4) for the first five input samples (0–4) would therefore be:

| X | X | X | X | X | X | X | X | 0 |
|---|---|---|---|---|---|---|---|---|
| X | X | X | X | X | X | 1 | 0 | 1 |
| X | X | X | X | 2 | 1 | 0 | 1 | 2 |
| X | X | 3 | 2 | 1 | 0 | 1 | 2 | 3 |
| 4 | 3 | 2 | 1 | 0 | 1 | 2 | 3 | 4** |

**used to generate 1st transform output

Note that the first four input samples only are used to setup the mirror in the RAM. Thus, for these clock cycles, only the first stage of the pipelined operations is performed, and the operation then is terminated.

As for the last four samples in a data stream, again, the shifting algorithm is essentially the same as usual. The only difference is that the input sample is taken from one of the eight words that were read from RAM, rather than the input stream (since the input stream has no more samples to provide). So for the case of a 100 sample input stream (0–99), the last four output samples would have the following sample numbers in the nine history positions:

| 92 | 93 | 94 | 95 | 96 | 97 | 98 | 99 | 98 |
|----|----|----|----|----|----|----|----|----|
| 93 | 94 | 95 | 96 | 97 | 98 | 99 | 98 | 97 |
| 94 | 95 | 96 | 97 | 98 | 99 | 98 | 97 | 96 |
| 95 | 96 | 97 | 98 | 99 | 98 | 97 | 96 | 95 |

Adder Stage

This stage computes the values that are inside the parenthesis for the core processing equation. Three of these results then are multiplied by the correct set of coefficients in the next stage. There are actually two rows of adders in this stage. The first row computes all the sums of the positive and negative indexed input samples (e.g. d[4]+d[−4], d[3]+d[−3], etc . . . ). The next row then computes the final resultant sum. Note that there is the option to add or subtract the d[3]+d[−3] term in one of these adders and this is determined by the parity of the transform operation. The negative option is used for the H Encode and EVEN Decode modes (an XNOR function).

Also note that there is no divide by 2 during this process, as would be required for two of the sums. Instead, the 2× version of these sums is computed, and the divide by 2 is performed in the multiplier stage. This allows all of the results of this stage to be 18 bits in precision (3.15), thus imposing no need for rounding/truncation since the input samples are all 16 bits (1.15).

Multiplier Stage

The three multiplications mentioned above are done in this stage. The coefficients are selected as follows (selecting coefficients from the A or B wavelet):

| ENC/ | ODD/ H/ | COEFF 0 | COEFF 1 | COEFF 2 |
|------|---------|---------|---------|---------|
| 0 | 0 | B | A | B |
| 0 | 1 | A | B | A |
| 1 | 0 | A | A | A |
| 1 | 1 | B | B | B |

The second column of this table is also referred to as the "parity" bit since for encode, the even indices generate L samples, and the odd indices generate H samples.

The coefficients are all stored in 16 bit (2.14) format, resulting in a product precision (after 2.14×3.15 multiply) of 4.29. The <0> product term must undergo a divide by 2 as discussed above in the Adder stage. This makes the precision of this term 3.30. Also performed in this stage is the divide by 2 on the adder stage result that is not multiplied (the steady-state term). This term's precision is now 2.16.

To avoid rounding logic during this stage, an extra bit of precision on each term (beyond the desired rounding precision) is sent on the next stage, the Accumulator. Since the final result is to be in the 1.15 precision format, each of the terms is truncated to 16 fractional bits. This is illustrated in the block diagram of FIG. 5.

Accumulator Stage

This is the stage that generates the output of the transform operation. It must add the four terms that the previous stage has provided. Three of these terms must be rounded to 15 fractional bits from 16 fractional bits. This is accomplished by adding this 16th bit twice in the same position. If the bit is 0, then this is the same as truncation. If the bit is 1, then this results in adding a 1 in this position.

Also, the final result is rounded differently depending on whether the part is in encode or decode mode. In encode mode, there is a gain factor of 2 involved in this operation. Thus the final result needs to be divided by 2 (or in other words, rounded to 14 fractional bits with 2 integer bits) to avoid growth in precision. For decode, this is not the case, and the final result can be rounded to 1.15 format.

In addition, just as for the adder stage, there is an option to add or subtract the <1> term from the multipliers. The logic is the same: the subtraction option is used for the H Encode and EVEN Decode modes (an XNOR function).

The resulting 4-summand adder with built-in rounding can be realized with an array adder using 3.5 rows of full adders (i.e. 3 full adders and 1 half adder per bit), along with some multiplexing requirements for saturation, selecting negative operand, and for final result shifting (encode vs. decode).

The final result may either be stored for a future recursive wavelet transform, or be flagged as a final transform result which is to be sent on to be entropy encoded. The next section will discuss the implementation issues for a multiple-level wavelet transform processor.

The generation of the first element of either of the high-pass or low-pass filtering equations listed above will be described below with reference to FIG. 5. From the explanation, the generation of the remainder of the elements should be apparent to those skilled in the art.

Video data point $d_{-4}$ is received by adder 161. Adder 161 also receives data point $d_4$ from RAM 160. Adder 161 provides sum $d_{-4}+d_4$ to adder 165. Point d0 is provided by RAM 160 to multiplier 163 which multiplies point d0 by two and provides product 2do to adder 165. Adder 165 provides sum $2d_0+d_{-4}+d_4$ to latch 167. Latch 167 then provides sum $2d_0+d_{-4}+d_4$ to multiplier 169 on a following clock cycle which multiplies that sum by coefficient a0 or bo (assume a0 in this example). The product $a0(2d_0+d_{-4}+d_4)$ is provided to divider 171 (which can by implemented physically as an accumulator). The result $a_0(d_{-4}+d_4/2+d_0)$ is provided to latch 173 which, on a subsequent clock cycle, outputs the result to adder 175. Adder 175 adds the element to the other elements of the low-pass or high-pass equations.

Multiple-Level Wavelet Transforms

Figure 6A:
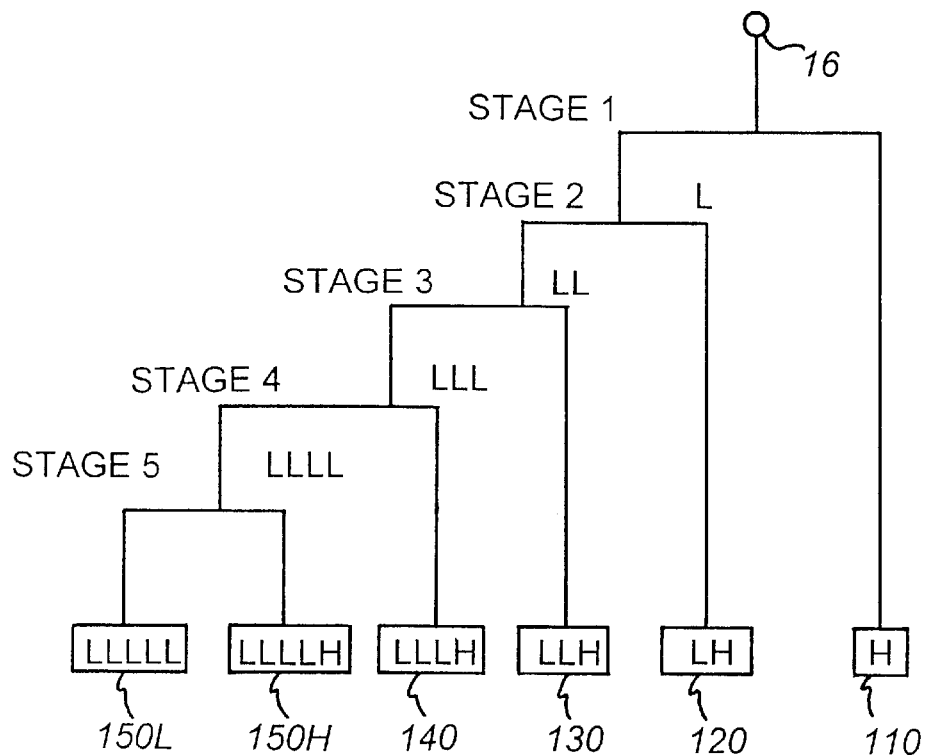
FIG. 6A is a functional block diagram showing a one-dimensional, recursive, wavelet-based filtering scheme performed during analysis of video signals.
Figure 6B:
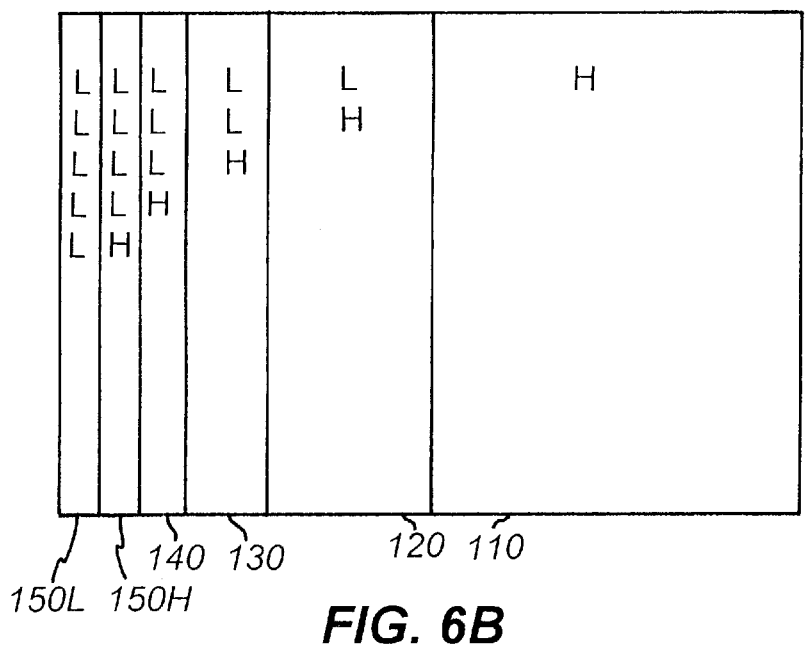
FIG. 6B is a block diagram of a one-dimensional frequency plot achieved by filtering in accordance with the scheme of FIG. 6A.

FIG. 6A is a functional block diagram showing a one-dimensional wavelet-based filtering scheme performed during analysis of video signals. Five stages of high-pass and low-pass filtering are shown to produce a desired frequency plot, including multiple sub-band blocks, as shown in FIG. 6B. The filtering can be performed recursively by one set of high-pass filter banks and one set of low-pass filter banks, as will be explained in more detail below. While five stages of filtering are shown in FIG. 6A, it should be understood that more or fewer stages of recursion could be implemented to suit a particular application (i.e., a particular desired compression ratio or frequency plot).

As shown, an input signal is received on input 16 and, during stage 1, the input signal is high-pass filtered (and down-sampled) producing sub-band H and low-pass filtered (and down-sampled) producing sub-band L. Sub-band H is retained as block 110 while sub-band L is recursively high-pass filtered and low-pass filtered during stage 2. During stage 2, the high-pass filtering produces sub-band LH and the low-pass filtering produces sub-band LL. Sub-band LH is retained as block 120 while sub-band LL is recursively high-pass filtered and low-pass filtered during stage 3. The process continues through stage 5. During stage 1, block 110 is retained; during stage 2, block 120 is retained, etc.

The frequency plot produced includes the blocks retained during the recursive filtering, as shown in FIG. 6B. The sub-bands desired to be retained (as opposed to recursively filtered) generally are selected because they include information useful in reconstructing the signal. Typically, redundant information is present among the different frequency bands. This motivation behind this process is as follows. The L data stream still contains most of the image after the image has been transformed, and therefore cannot be compressed too much. The H data stream contains only edge information, and can thus be heavily compressed. By further transforming the L data streams, the main portion of the image is moved into the L streams, while the H streams become much more compressible. There is usually no advantage to further transforming the H streams since there is very little energy in these streams to begin with.

Depending on the nature of the input data, there is a point where there is no benefit to perform further decomposition beyond a certain level (stage) (for video data, 4–5 levels is quite acceptable). Note that because at each level (stage), only half of the data is further transformed, the processing requirements are halved as well.

Thus, a single wavelet transform processing core that can operate at twice the input frequency can perform the transform to any desired level. The only hardware cost for performing multiple levels, is the memory requirement to buffer the last N samples of each data stream (1 per level) to perform the N tap filter. Actually, the memory requirement can be reduced to N-1 samples per level, so long as the newest input sample can be provided simultaneously with the N-1 samples.

Multi-Level Wavelet Transform Data Flow Using Single Processing Core

Figure 7:
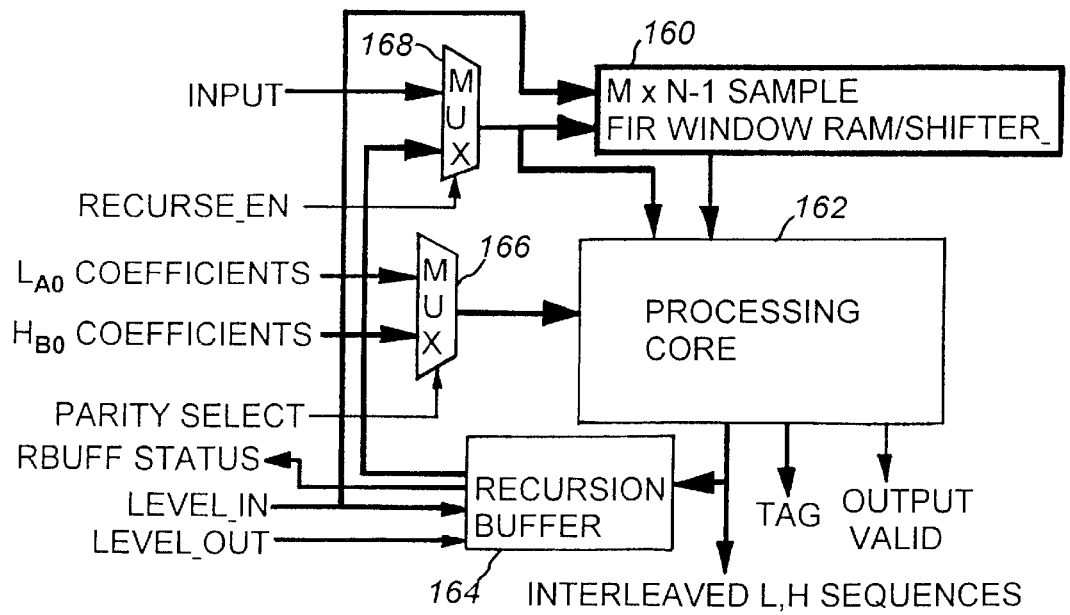
FIG. 7 is a block diagram of a multi-level wavelet-based transform system.

FIG. 7 is a block diagram of a multi-level, recursive, wavelet-based filtering system according to the present invention. The system includes an FIR window RAM shifter 160, a processing core 162, a recursion buffer 164, and multiplexers 168 and 166. The recursion buffer and associated feedback loop allows for recursive filtering of the low-pass results. The low-pass results to be recursively filtered are temporarily stored in the recursion buffer 164. Multiplexer 168 selects between the data input and the low-pass results stored in the recursion buffer 164 to be recursively filtered based on the value of the signal Recurse-en. Multiplexer 166 selects one of the high-pass or low-pass filter coefficients, as described above.

In the previously discussed embodiments, a shift register was utilized to store the sample history for the FIR filtering operations. For multiple level processing, a shift register would be required for each level of the transform (2 latches per bit). In order to save area, the multiple-level implementation can employ a RAM or Register File for this purpose, requiring only 1 latch per bit, with a single set of pipeline latches to store the result of the RAM read.

For example, during each processing cycle for a 9-tap filter, the newest sample of the transform level is either read from the recursion buffer or loaded directly for the first level of the transform, and the remaining 8 samples in the level history are read from the RAM. Also during this same cycle (in a different phase of the clock), the samples are shifted and written back into the RAM (new sample written into word[0], word[0] written into word[1], . . . , word[6] written into word[7], and word[7] is no longer needed).

RAM Based Shift-Register for FIR Sample Window

Figure 8:
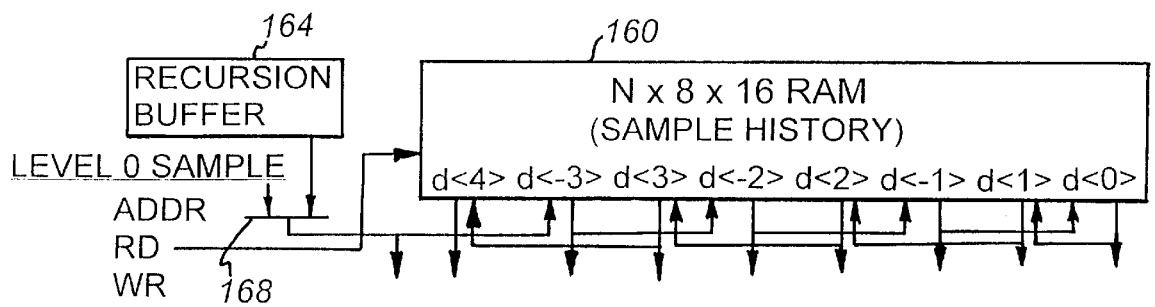
FIG. 8 is a part schematic, part block diagram of a RAM-based shift register used in the system of the present invention.

As shown in FIG. 8, in place of the memory to hold the newest sample of the FIR window history, a recursion buffer 164 is utilized to store these new samples for each sub-stream. This is due to the pipeline latency of the processing core. It is desirable to always provide a single address to the FIR Window RAM 160 since it must perform a Read and shifted Write Back for each transform operation. The final result of the transform operation will be available several clocks later, at which time the FIR Window RAM may be fetching the sample history for a different level of the transform. This result is thus stored in the recursion buffer, awaiting to be used in the future. Therefore, the recursion buffer is actually a two-port register file that can simultaneously store the result of a transform operation, and provide the newest sample to another transform operation. If the result of the transform operation is not to be recursed (e.g. H, LH, LLH, LLLL,LLLH data streams), then the OUTPUT VALID signal will go HI, and a TAG identification of the data stream will be provided. This will signal the block downstream to take this result as the next transformed data value for the stream that TAG represents.

Multi-Level Wavelet Transform Sequencing

Because a single processing core is being used for all the levels of the transform, a sequencing scheme must be utilized such that each level of the transform has devoted processor bandwidth, the FIR Sample Window RAM is properly maintained, and the resultant outputs of each transform operation are piped to the proper destination. During each clock cycle, only one pipelined operation can be scheduled, and this operation is in the form of a pipe command. The command must consist of the following: Transform level, edge mirror status and count, and parity bit. The following section discusses how this command is derived for each clock cycle.

Transform Level Sequencing

The basic sequence scheme involves assigning cycles for each transform operation to each level of the transform such that each level is given the processing bandwidth that it requires. For example, level 0 requires half of the clock cycles. Level 1 requires ¼ of the clock cycles, and so forth. Also, the input data to level 0 must be received at the level 0 processing frequency to avoid any buffering requirements. The sequencing requirement is summarized as follows (number 0–3 refer to levels 0–3 of the transform):

0 1 0 2 0 1 0 3 0 1 0 2 0 1 0 X

Note that there is one unused slot at the end of this sequence. This could be used to further decompose the LLH stream to LLHL and LLHH since this is ⅟₁₆ of the bandwidth. This sequence is constantly repeated and thus guarantees the appropriate processing bandwidth for each level of the transform (for analysis and synthesis). This algorithm is easily implemented with a mod 16 counter (include schematic). Also, there is a latency penalty on each level of the transform due to the edge mirroring requirement. For example, a 9-tap wavelet filter bank would have a latency of 5 samples during the level 0, 9 samples during the level 1, 17 samples for the level 2, and 33 samples for level 3, summing to 64 sample clocks, or 128 system clocks, of latency.

Reading/Updating Control and Status Register (CSR) for Each Transform Level

Each level of the transform has a set of control and status bits that are needed for the sequencing algorithm to determine if this level is to be scheduled, and how the command is to be formed. These status bits are summarized as follows:

| NAME | Number of Bits | Ctrl ©/Status(S) | DESCRIPTION |
|---|---|---|---|
| Edge Status | 2 | S | 00 => RESET state, 01 => Left Edge 10 => Center, 11 => Right Edge |
| Edge Count | 3 | S | Needed for edge mirroring control, counts left edge from 0 to 4, and right edge from 0 to 3. |
| Parity | 1 | S | H█████████████████████ |
| Column Count | 9 | S | Counts column index for comparing to number of columns in level to determine when end of line is reached. |
| Number of Columns | 9 | C | Sets number of columns in level. |

During each clock cycle, the scheduled transform level's CSR is read, updated and written back. The decision to schedule a pipe command for that level is based on the status bits read for that level, in addition to the status of the recursion buffer (sec. 5.1) for sub-levels, or a "Valid Data" signal for level 0. If a pipe command is to be generated, than the status for this level is updated and written back, otherwise the status bits go unchanged. The update process involves incrementing the column count, flipping the parity bit, and going to the next appropriate edge state.

Sequencing Scheme

The encode sequencing scheme is self-perpetuating as long the level 0 is properly started. As the level 0 advances in its edge status, L results from level 0 will be stored in the recursion buffer which will signal the sequencer to schedule level 1 pipe commands when level 1's turn in the sequence arrives. This process will continue until all of the levels are completed (edge status=11, edge count=011). At this point, all of the status bits for each level are reset to 0, and the sequencer will wait for the start of the next row.

The decode scheme also is self-perpetuating as long as the next sample in any of the transformed blocks is available to be loaded during any cycle. In this case, the sequencing begins at the lowest level of the transform (e.g. level 3), and recursions are then interleaved with samples for transformed blocks in the next lowest level. For example, the L and H data for level 3 must be loaded from Memory (this data is pre-loaded in external DRAM). The results for this level are then interleaved with the H data samples for level 2 processing. Thus for all levels except the lowest level, a pipe command is generated for even indices (parity=0) when the lower level result is available in the recursion buffer. A pipe command is always generated for odd indices (and for the lowest level) as long as the column count for that level is still less than the max.

Architecture for Two-dimensional Wavelet Transform

Single-Level Application

Figure 9:
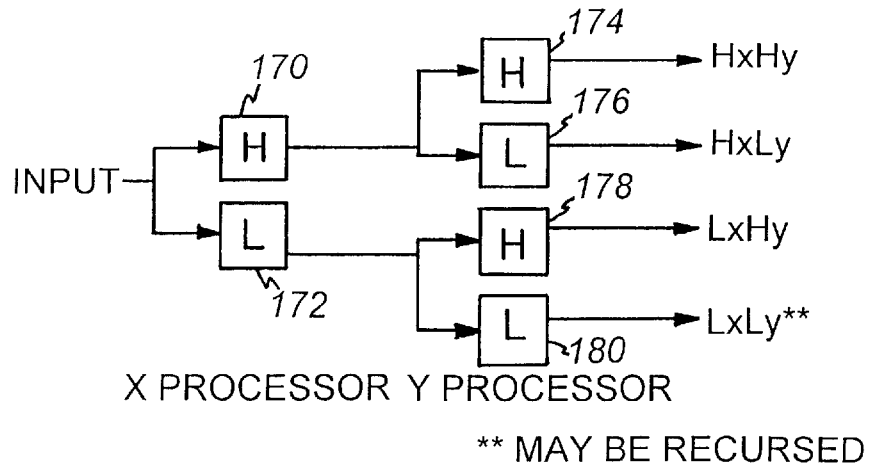
FIG. 9 is a functional block diagram showing a single level, two-dimensional, recursive, wavelet-based filtering scheme performed during analysis of video signals.

To perform a two-dimensional wavelet transform on video data, two wavelet processor cores must be utilized: one for the X transform, and the other for the Y transform. The single-level XY wavelet analysis transform is performed by first doing an X-oriented transform, and then doing a Y-oriented transform on both the L and H blocks that the X processor generated. A block diagram of a single level, two-dimensional, wavelet-based filtering system according to the invention is shown in FIG. 9. As shown, the system includes a horizontal X processor, consisting of high-pass filter 170 and low-pass filter 172, and a vertical Y processor, consisting of high-pass filter 174, low-pass filter 176, high-pass filter 178 and low-pass filter 180. An input is filtered by both horizontal filters, the results of which are provided to filters of the vertical processor. Results HxHy, HxLy, LxHy and LxLy are produced as shown.

Figure 10:
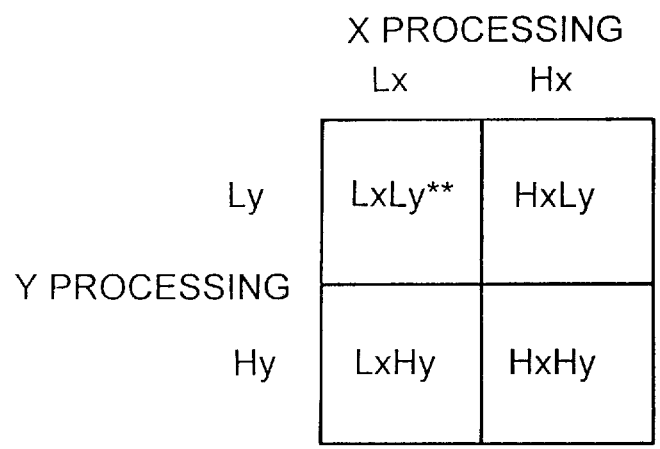
FIG. 10 is a block diagram of a two-dimensional frequency plot achieved by filtering in accordance with the scheme of FIG. 9.

FIG. 10 is a block diagram of the frequency plot including the blocks produced by the system of FIG. 9.

Note that the X and Y processing stages are separable: i.e. the order of processing does not matter. The X processor is placed first, in one embodiment, due to the scanning orientation of the incoming data stream. If the incoming data was scanned vertically rather than horizontally, the alternative would be the case (and the Y transform would be first). For the same reasons, the recomposition (synthesis) would need to go through the Y transform first, and then the X transform (such that the reconstructed video is oriented horizontally).

Figure 11:
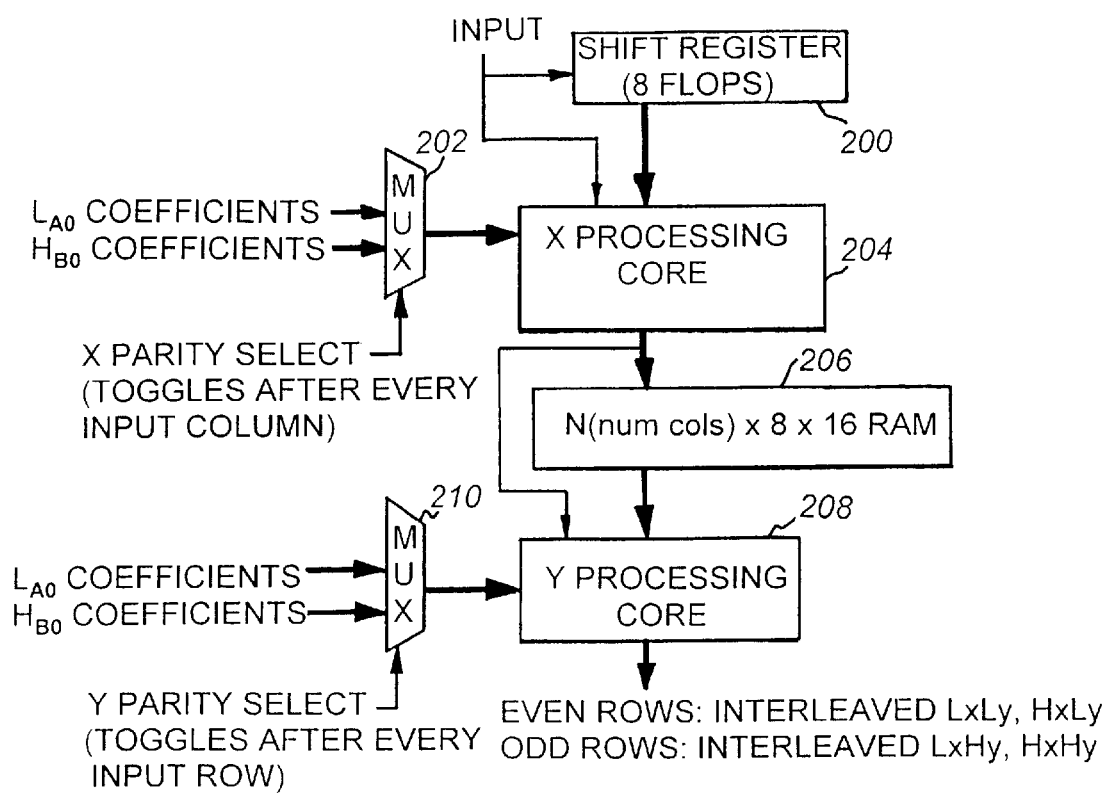
FIG. 11 is a block diagram of a single level, two-dimensional, wavelet-based, analysis filtering system.

FIG. 11 is a block diagram of a single level, two-dimensional, wavelet-based analysis filtering system according to the present invention. As shown, the system includes a horizontal filter processing core 204 and a vertical filter processing core 208. The low-pass and high-pass filter coefficients are provided to the horizontal filter processing core 204 by multiplexer 202 based on the X parity select signal which toggles after every input column processed. Similarly, low-pass and high-pass filter coefficients are provided to the vertical filter processing core 208 by multiplexer 210 based on the Y parity select signal which toggles after every input row processed. Horizontal filter processing core 204 receives a direct data input and a shifted data input from shift register 200. Vertical filter processing core 208 receives an input from RAM 206 or the result from the horizontal filter processing core.

During operation, the even rows are interleaved to produce blocks LxLy, HxLy and the odd rows are interleaved to produce blocks LxHy, HxHy.

While the horizontal X processing core needs only 8 words of sample history, the vertical Y processing core needs 8 words per column of sample history. For example, for a 360 column input stream, the Y processor would need 360*8 or 2880 words of RAM. The number of rows has no impact on the memory requirement. Essentially, the vertical processor can context switch to any column in the input stream, while the horizontal processor is only processing the input as a sequentially sequenced data stream. As the horizontal X processor computes a result for a specific column, the vertical Y processor can then fetch the sample history for that column for the Y processing, and then update that sample history for the next row. Therefore, the Y parity is constant throughout the row of input data, and toggles on row boundaries. The output sequence reflects this pattern as illustrated in FIG. 11.

Figure 12:
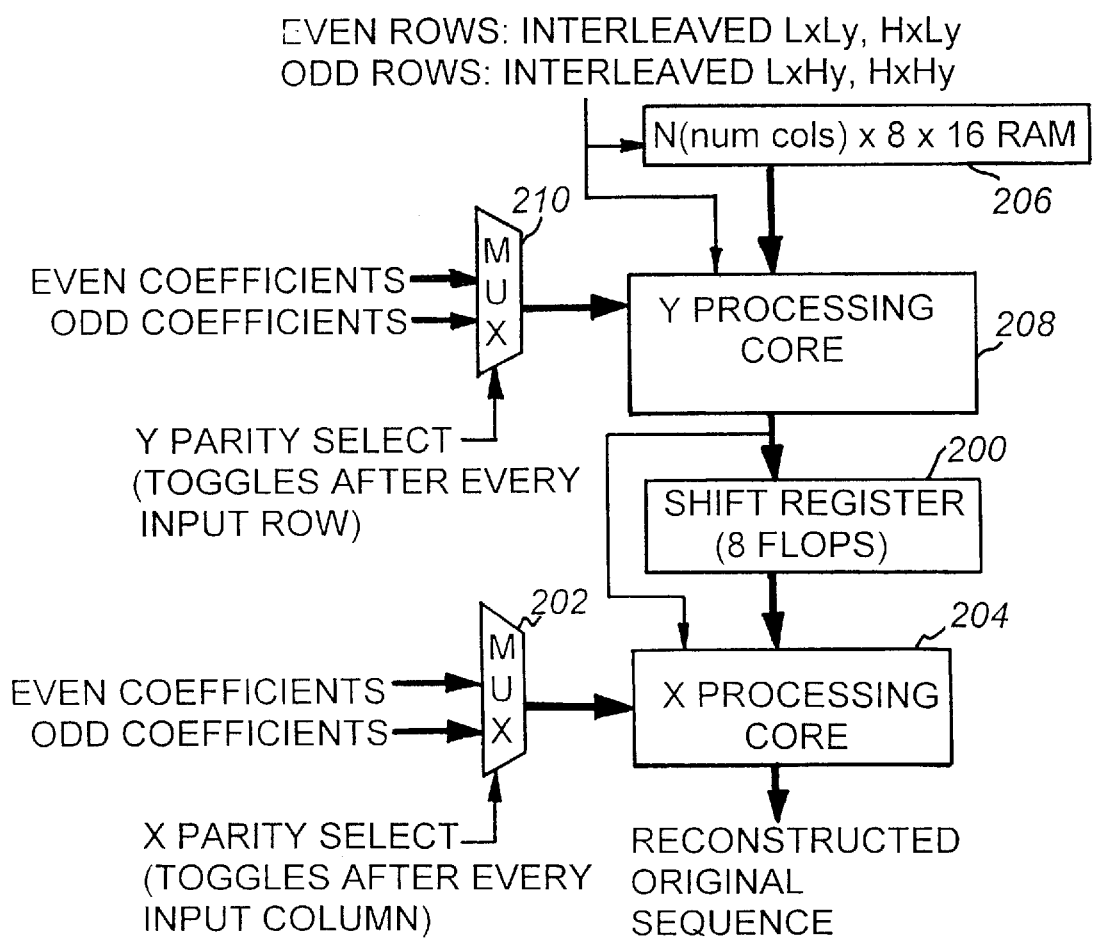
FIG. 12 is a block diagram of a single level, two-dimensional, wavelet-based, synthesis filtering system.

FIG. 12 is a block diagram of a single level, two-dimensional, wavelet-based synthesis filtering system according to the present invention. Like reference characters to those used in FIG. 11 refer to similar elements in FIG. 12. Because of the similarity in structure and operation of the system of FIG. 12 to that of FIG. 11, it will not be described in detail herein. It should be noted, however, that a difference is the ordering of the vertical and horizontal processors. In the system of FIG. 12, the vertical processor comes first.

As stated earlier, the synthesis data flow must first go through the vertical Y processor, and then be followed by horizontal X processing to ensure that the reconstructed data is oriented in the X direction.

Figure 13:
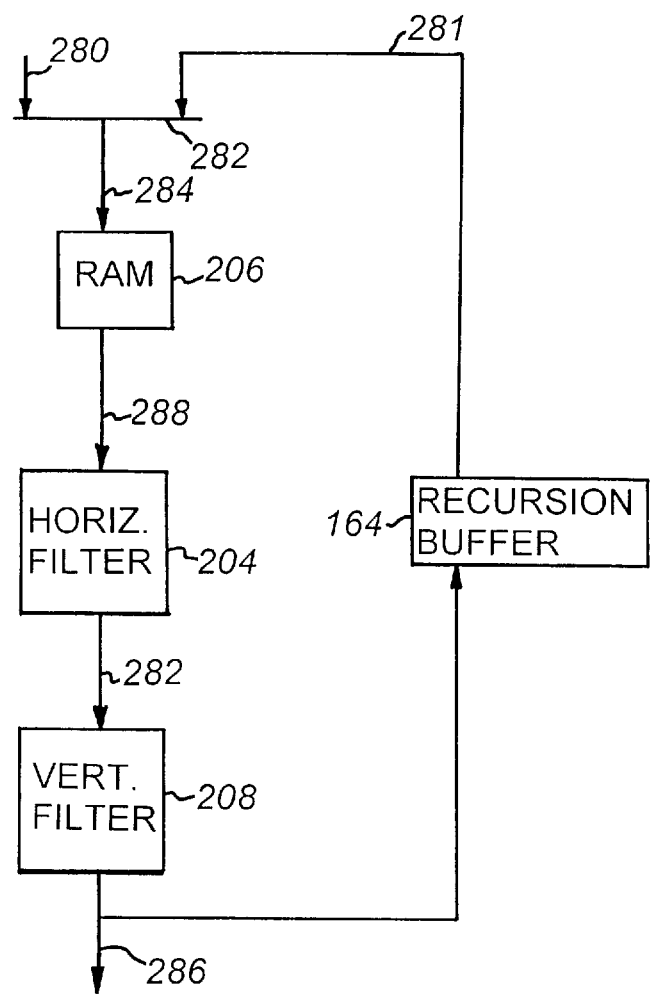
FIG. 13 is a block diagram of a two-dimensional, wavelet-based, recursive, analysis/synthesis filter system according to the present invention.

FIG. 13 is a block diagram of a two-dimensional wavelet-based analysis/synthesis filtering system according to the present invention. As shown, an input video signal is received on bus 280 and provided to multiplexer 282. Multiplexer 282 also receives on bus 281 previously filtered video sub-band data (from recursion buffer 164) to be recursively filtered. Multiplexer 282 outputs on bus 284 either the input video data or the previously filtered video sub-band data (alternating on each clock cycle) to temporary memory buffer random access memory (RAM) 206 which temporarily stores the video data for subsequent filtering.

Video data is provided from RAM 206 on bus 288 to horizontal filter bank 204 and on bus 282 from horizontal filter bank 204 to vertical filter bank 208. Each bank 204 or 208 filters the provided video data in its respective dimension. Both analysis and synthesis are performed by each filter bank; and high-pass filtering and low-pass filtering also are performed by each filter bank. During analysis, the filtered sub-band video data is provided on output bus 286 and either is stored as a desired block of video data or is recursively filtered by the system. The sub-band output also is provided to recursion buffer 164 which, under control of a control unit (not shown), provides the sub-band data on bus 281 to multiplexer 282 when that sub-band is to be recursively filtered.

To reduce the memory capacity requirement of the RAM 206, the system of the present invention operates on one portion (field) of a frame of input video data at a time. As a result, the required minimum memory storage capacity of the RAM is equal to N×M×W, where N is equal to the sum of the number of columns or rows in all levels of the desired frequency plot, M is equal to a length of the respective dimension filter bank −1, and W is a word length, in bits (typically 16), of the input video signal. In one embodiment of the invention, with a 9-tap filter being used for the horizontal filter bank, eight 16-bit registers are required per level. With five levels in the desired frequency plot, forty 16-bit registers are required. For the vertical filter bank, the number of registers depends on the number of columns per level and on the number of levels, as described below.

Multiple Level Implications to Two-Dimensional Transforms

To perform multiple-level two-dimensional wavelet transforms, in one embodiment of the present invention, only the LxLy block is further transformed. Although there are applications where the decomposition of other blocks is desirable, and the architecture/sequencing of the system of the present invention does allow some flexibility in doing this, such an alternate embodiment is not described herein. Such an alternate embodiment, however, is envisioned to be part of the present invention.

Figure 14:
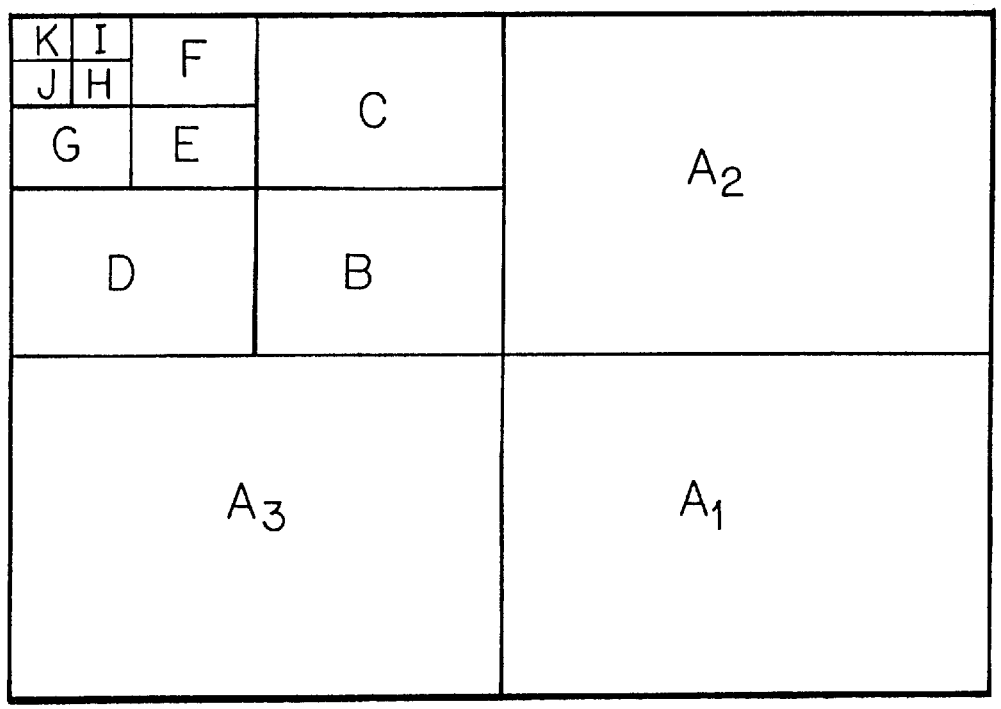
FIG. 14 is a block diagram of a frequency plot having multiple sub-band blocks produced by a four-level, two-dimensional, wavelet-based analysis filtering scheme.
Figure 15:
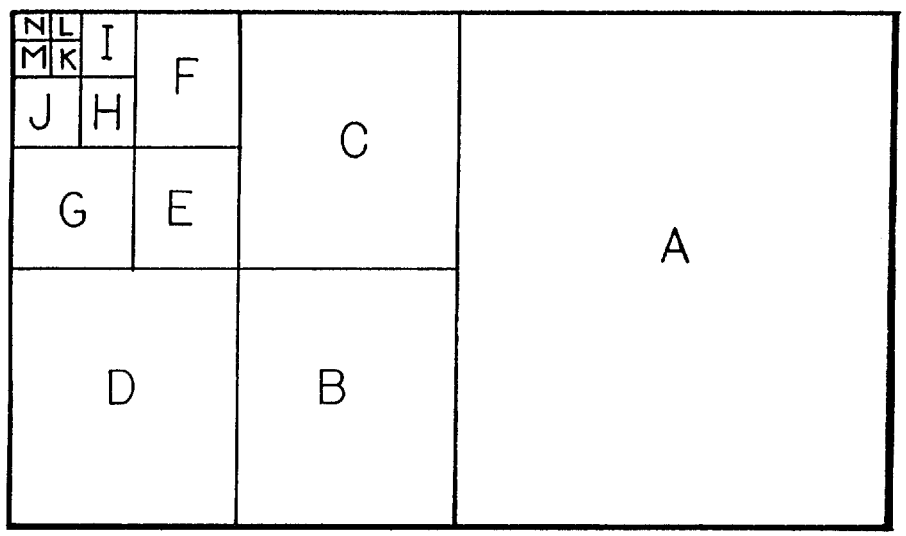
FIG. 15 is a block diagram of a desired frequency plot having multiple sub-band blocks generated by the a multi-level, two-dimensional, recursive, wavelet-based analysis filtering scheme according to the present invention and shown in FIG. 16.

FIG. 14 is a block diagram of a frequency plot having multiple sub-band blocks produced by a four-level, two-dimensional, wavelet-based analysis filtering scheme. The scheme produces blocks A1, A2, A3 and B–K. A modified version of the plot shown in FIG. 14 preferably is produced by the system of the invention. Such a plot is shown in FIG. 15 in which blocks A–N are produced with a five-level transform. The level 0 yielding blocks A1–A3 in FIG. 14 is implemented as a horizontal-only analysis yielding a single block A, shown in FIG. 15, and the Lx result further undergoes this 4-Level XY Analysis.

Figure 16:
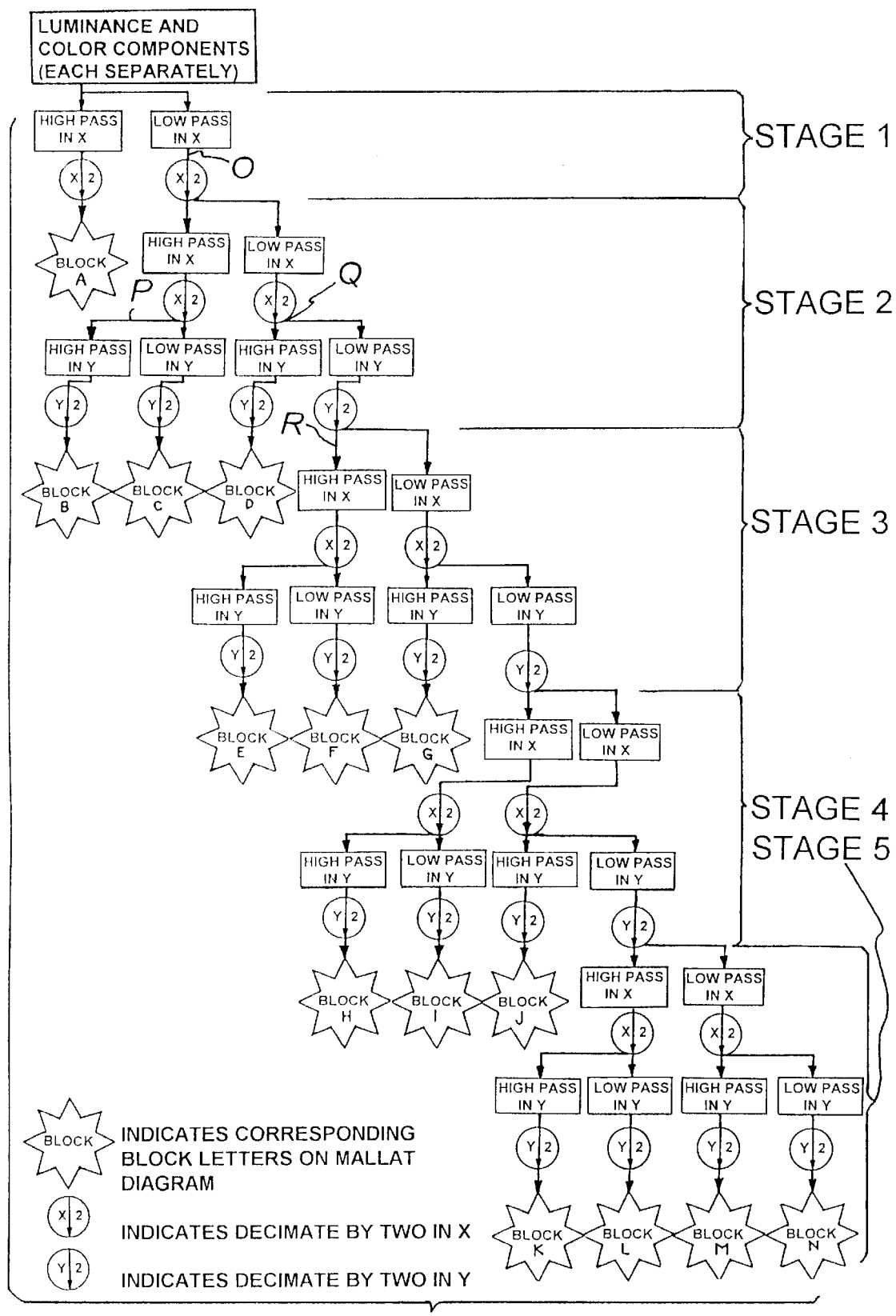
FIG. 16 is a functional block diagram showing a multi-level, two-dimensional, recursive, wavelet-based analysis filtering scheme according to the present invention.

FIG. 16 is a functional block diagram showing a two-dimensional, wavelet-based, recursive filtering scheme of the present invention. As shown in FIG. 16, five stages of recursion are implemented to produce a desired two-dimensional frequency plot shown in FIG. 15. It was discovered by the Applicants herein that the particular desired frequency plot of FIG. 15, including the multiple sub-band blocks labeled A through N, which together can comprise a field (frame portion) of video data, is desirable for lossless video compression.

With the scheme of the present invention, each of the luminance and color components of an input video signal is filtered separately. The system can accommodate a luminance, chrominance (4, 2, 2) format, an NTSC format, or other video signal arrangement as stated below.

In FIG. 16, for each stage of recursive filtering, the high-pass filtering and low-pass filtering in each of the horizontal (X) and vertical (Y) dimensions are labeled separately. Additionally, the down-sampling by two for each step in each stage also is labeled separately. It should, however, be appreciated that, in accordance with the present invention, a separate filter bank exists for each of the horizontal dimension and vertical dimension which performs both high-pass filtering and low-pass filtering during each stage of recursion. Similarly, the up-sampling and down-sampling can be performed by common interpolators and decimators, respectively, or as a pipelined step within each of the filter banks.

As shown in FIG. 16, during stage 1, an input video signal is received and a field (video frame portion) is high-pass filtered in the horizontal (i.e., X) direction and decimated by a factor of 2 to produce a sub-band retained as block A, and low-pass filtered in the X direction and decimated by a factor of 2 to produce a sub-band signal 0 which is recursively filtered in stage 2. In stage 2, the sub-band signal 0 passed from stage 1 is high-pass filtered in the X direction and decimated by a factor of 2 to produce a further sub-band signal and is low-pass filtered in the horizontal X direction and decimated by 2 to produce an even further sub-band signal. Each of those sub-band signals P and Q then is high- and low-pass filtered in the vertical (i.e., X) direction and decimated by 2 producing the sub-band signals retained as blocks B, C and D as well as a sub-band signal R which is passed onto stage 3. The process continues through stage 5 until each of the sub-band blocks A through N have been saved, forming the field of video data frequency plot shown in FIG. 15.

In one embodiment, for NTSC regular pixel size, a field of video data comprises 720 columns and 243 rows, which is a portion of a video frame that comprises 858 columns and 262.5 rows. It should be appreciated that the input video data is oriented in the horizontal direction and, in one embodiment, video data is received at 13.5 MHZ, and a clock of the system operates at 27 MHZ, such that one received pixel will be processed every other clock cycle. In one such an embodiment, the first stage of filtering is accomplished at 13.5 MHZ, the second stage of filtering is accomplished at 7.75 MHZ, etc. The 5 stages of filtering can be performed with the 27 MHZ clock.

The desired frequency plot of the present invention also has the added advantage of cutting RAM requirements in half (remember that 8 words of RAM are needed for each column in each level of the transform). For the normal block decomposition illustrated in FIG. 14, the total Y RAM requirement for a 768 column image would be (768+384+192+96)*8=11,520 words. Now with the modified blocking structure illustrated in FIG. 15, this becomes (384+192+96+48)*8=5760 words.

Figure 17:
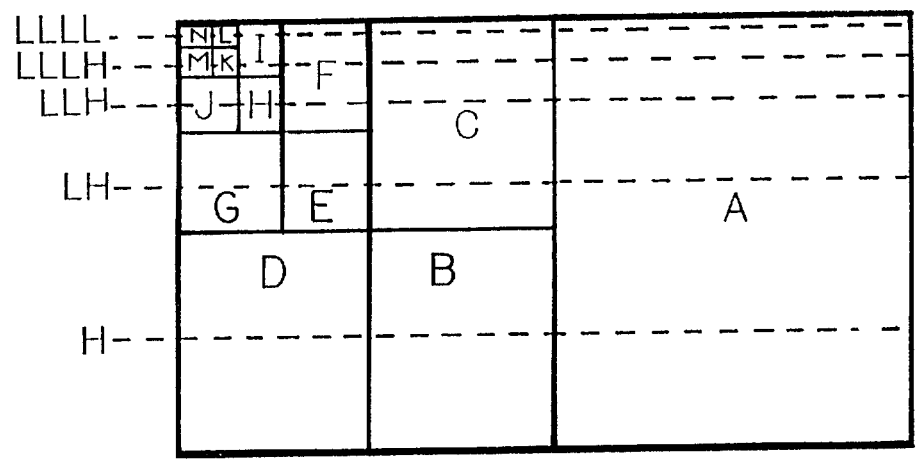
FIG. 17 is a block diagram of the desired frequency plot shown in FIG. 15 further showing the different transform level patterns.

Also, the Y processing section adds another variable to the sequencing. Every row of video data will have a different pattern of transform levels (total of 5 patterns). These patterns may be determined by drawing a horizontal line through the blocking diagram of the wavelet transform through the 5 unique regions shown in FIG. 15. This is done in FIG. 17 which is a block diagram of the desired frequency plot shown in FIG. 15 further showing the different transform level patterns.

The pattern actually refers to the number of levels in the transform for that row of video:

| Pattern Identifier | Number of Transform Levels | Processing Bandwidth |
| --- | --- | --- |
| LLLL | 5 | $\frac{1}{16}0$ |
| LLLH | 5 | $\frac{1}{16}$ |
| LLH | 4 | $\frac{1}{8}$ |
| LH | 3 | $\frac{1}{4}$ |
| H | 2 | $\frac{1}{2}$ |

The pattern for each row is self-determined by the sequencing algorithm, but can also be determined by the processing requirement for each of the 5 patterns (just as for the horizontal X processing section).

For this implementation, the recursion buffer now is placed at the output of the vertical Y transform (input to horizontal X transform) for encode, or at the output of the horizontal X transform (input to vertical Y transform) for decode. Since each level now has an added dimension, each level now can provide results to 1 of 4 possible blocks. Only the LxLy block can be recursed to the next level (except for the last level). Results from the other 3 blocks are always sent on to the DRAM, using the horizontal X and vertical Y parity bits along with the level of the transform as a block tag. The horizontal X history RAM must now support up to 5 levels of transforms, resulting in a 5×8×16 bit register file (8 words per level). The vertical Y history RAM must support all the columns in each level of the transform as explained earlier, with 8 words per column per level.

Here is where the true value of the recursion buffer can now be fully appreciated, as there is no need to have a recursion buffer word for each column for each level of the transform. Without the recursion buffer, there would need to be 9 words of RAM per column instead of only 8. Remember, the purpose of the recursion buffer is to store the result of a transform level that must further undergo a transform operation on another level. The status of the recursion buffer word for each level of the transform is provided to the sequencer, and the sequencer in turn schedules the wavelet pipe operation at the appropriate time.

The final data path architecture for the system pipeline must allow for the following data flows directions:

·ENCODE: Video Data/RBUFF -> X pipe ->
                        Y pipe -> DRAM/RBUFF
and
·DECODE: DRAM/RBUFF -> Y pipe ->
                        X pipe -> Video Data/RBUFF In other words, the input for each pipe can come from either another block, the recursion buffer, or the other pipe. Also the output of each pipe can be sent to either another block, the recursion buffer, or the other pipe. In one embodiment of the invention, the implementation basically places the recursion buffer in between the 2 pipes, and all crossbar functions are performed by the recursion buffer as illustrated in FIG. 18.

Figure 18:
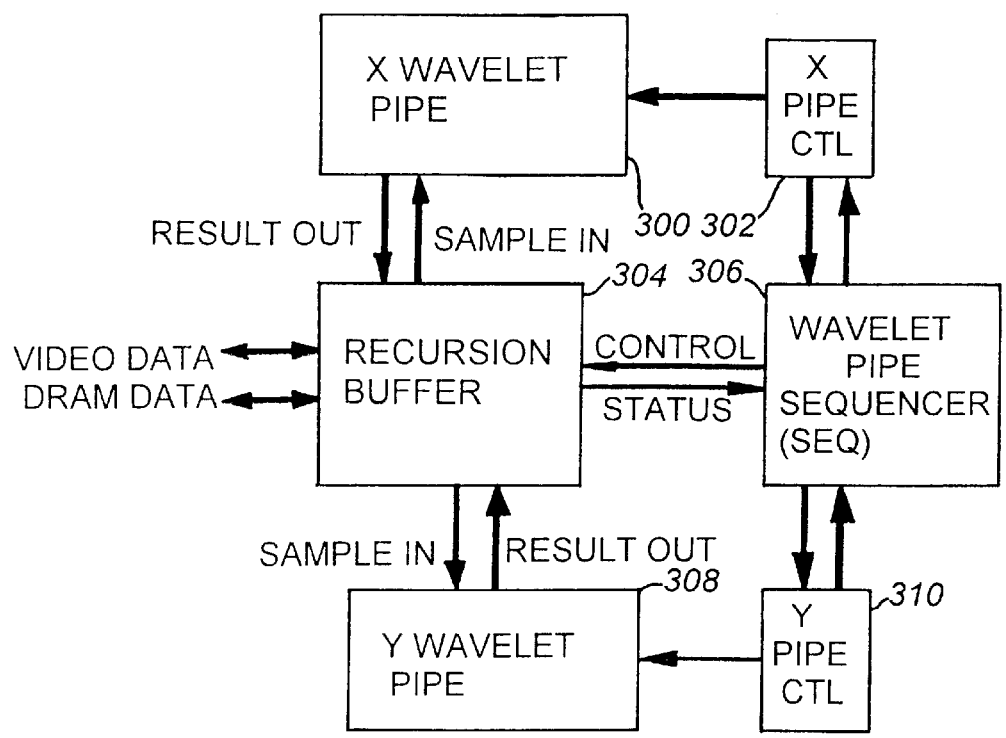
FIG. 18 is a block diagram of a multi-level, two-dimensional, wavelet-based processor according to the present invention.

FIG. 18 is a block diagram of a multi-level, two-dimensional, wavelet-based processor according to the present invention. As shown, the system includes a horizontal wavelet pipe 300 controlled by a horizontal pipe control 302, as well as a vertical wavelet pipe 308 controlled by a vertical pipe control 310. Recursion buffer 304 is placed between horizontal wavelet pipe 300 and vertical wavelet pipe 308 and receives results from the pipes and provides samples to the pipes under control of the wavelet pipe sequencer 306 (described below). Recursion buffer 304 receives video data and DRAM data.

Note the additions of pipe control blocks 302 and 310, and the wavelet pipe sequencer 306. The wavelet pipe sequencer 306 generates the pipe commands which are sent to the pipe control blocks 302 and 310. These blocks contain a bank of registers for each stage of the wavelet pipe (4 per pipe). The pipe command is shifted through these registers so that at any given clock cycle, each stage of the pipe has the pipe command available for the particular operation that it needs to do. The pipe control blocks convert these pipe commands for each pipe stage into control signals to the pipes (e.g. register loading signals, multiplexer selects, and RAM addresses). These pipe control blocks also tell the sequencer when a recursion buffer word is being filled. The data flow for this pipe command is the same as for the data path:

ENCODE: SEQ->Pipe Command->X pipe control->Y pipe control

DECODE: SEQ->Pipe Command->Y pipe control->X pipe control

Sequencing the Wavelet Pipe
Quandrant Control/Status Register

First, the table illustrating the control/status bits for each level of the transform must be updated to include both X and Y status:

| NAME | Number of Bits | Ctrl © Status(S) | DESCRIPTION |
|---|---|---|---|
| X Edge Status | 2 | S | 00 => RESET state, 01 => Left Edge 10 => Center, 11 => Right Edge |
| X Edge Count | 3 | S | Needed for edge mirroring control, counts left edge from 0 to 4, and right edge from 0 to 3. |
| X Parity | 1 | S | HI => encode, ODD/EVEN for decode |
| Column Count | 9 | S | Counts column index for comparing to number of columns in level to determine when end of line is reached. |
| Number of Columns | 9 | C | Sets number of columns in level. |
| Y Edge Status | 2 | S | 00 => RESET state, 01 => Left Edge 10 => Center, 11 => Right Edge |
| Y Edge Count | 3 | S | Needed for edge mirroring control, counts left edge from 0 to 4, and right edge from 0 to 3. |
| Y Parity | 1 | S | HI => encode, ODD/EVEN for decode |
| Row Count | 8 | S | Counts row index for comparing to number of rows in level to determine when end of field is reached. |
| Number of Rows | 8 | C | Sets number of rows in level. |
| Y Start Address | 10 | C | Sets starting address in Y RAM for this level. This is added to the Column Count to compute the Y address for this level. |

All of these bits must be maintained for each level of the transform (5 sets of control/status bits) except that level 0 does not need any vertical Y status since it is a horizontal X-only transform level. These sets of control/status bits are called the quadrant control/status registers or QCSR's since they represent the control and status 4 blocks per transform level.

At the start of each field, all status bits are cleared. At the start of each row (detected by a schedules pipe command in combination with horizontal X edge status=00), the horizontal X status is cleared. During each column of a row, only the horizontal X status is updated, while the vertical Y status is updated only on the last column of each row for the level. This allows the sequencing task to be self-perpetuating based solely on the number of rows and columns assigned to each level of the transform.

The number of rows and columns need not be allocated bits in the QCSR register file. These numbers can be determined from the transform level and the field image dimensions (horizontal XDIM and vertical YDIM). Level 0 row and columns sizes are the horizontal XDIM and vertical YDIM values. Theses values for the other levels can be computed from horizontal XDIM and vertical YDIM based on the following:

Num Rows[level]=(YDIM+1<<(level−1))>>level
Num Cols[level]=(XDIM+1<<(level−1))>>level Note that the number of rows/columns always is rounded up rather than truncated. This is due to the natural toggling of the parity bit for each level. The odd indexed result always goes in the low-pass L block (L H L H . . . L H L).

Also, the vertical Y start address may be stored as a lookup table since it is not updated. To accommodate the widest image size allowable by the described embodiment of the system of the invention, these addresses are set to 0, 384, 576, and 672 for levels 1–4.

Horizontal X Sequencer

The horizontal X sequencer block generates the sequence of levels described previously. This sequencer, however, also must schedule wavelet pipe operations for up to 5 levels of horizontal X transform. This process is still necessary in this embodiment of the invention since video data is still scanned in the horizontal X direction. It should be understood, however, that a vertical sequencer should be used if a vertical transform was performed first. Each row of processing can require up to 5 levels of transform which must be scheduled properly.

Pipe Command Generator

Once the status information is read for the level that the horizontal X sequencer schedules, the recursion buffer status signal (empty or full) for this level is sampled, and the decision is made on whether or not a pipe command for this level should be scheduled. The pipe command generator block load forms the pipe command that is to be sent to the pipe control blocks. The decision schemes are summarized as follows:

ENCODE: Level 0 is scheduled if VID_DATA_RDY signal is HI. Other levels are scheduled if RBUFF_FULL status signal is HI for that level.

DECODE: Level 4 is always scheduled unless the level is finished for the current row. Other levels are always scheduled if either of the X or Y parity bit is HIGH and the level is unfinished for the current row. When both the X and Y parity bits are LOW, the level is scheduled only if the recursion buffer RBUFF status signal is HI for that level.

The pipe command must include all of the information that the pipe control blocks will need. The following table summarizes the fields in the pipe command:

| NAME | Number of Bits | DESCRIPTION |
|---|---|---|
| X Edge Status | 2 | 00 => RESET state, 01 => Left Edge 10 => Center, 11 => Right Edge |
| X Edge Count | 3 | Needed for edge mirroring control, counts left edge from 0 to 4, and right edge from 0 to 3. |
| X Parity | 1 | HI => encode, ODD/EVEN for decode |
| X Address | 3 | Transform level, needed as address for X History RAM and RBUFF. |
| Y Edge Status | 2 | 00 => RESET state, 01 => Left Edge 10 => Center, 11 => Right Edge |
| Y Edge Count | 3 | Needed for edge mirroring control, counts left edge from 0 to 4; and right edge from 0 to 3. |
| Y Parity | 1 | HI => encode, ODD/EVEN for decode |
| Y Address | 10 | Address of the column that is being Y transformed. |

QCSR Level Mapper

The QCSR level mapper block assigns a translation of the levels that the XSEQ generates, into actual QCSR addresses. Under normal circumstances, these values are the same. So while the need for this block is not obvious at first, it is extremely effective is dealing with a very important problem: It has been shown that there will be a 64 row latency due to the edge mirroring requirement. However, the vertical blanking region (dead region between fields of video) is only about 20 lines of video. Thus a speedup process must be utilized. This process involves shifting the mapping for the QCSR levels to give each level twice as much processing bandwidth. For example, at the end of the active video, only level 0 is finished processing, while the remaining levels must complete their respective bottom edge Y processing. Since level 0 is completed, it no longer is needed to be scheduled. Also, the input data for level 1 is now coming from memory rather than from level 0 results. Thus level 1 is remapped to level 0, level 2 is remapped to level 1, and so forth. When level 1 is completed, then another shift takes place. This continues until level 4 is shifted into the level 0 position, and level 4 is finished. This marks the End of Field event for encode. For decode, this processing must be done at the beginning of the field prior to active video. In this case, the wavelet pipe generates a PIPE_RDY signal to the VIDEO INTERFACE when this top edge is completed, and the VIDEO INTERFACE then stalls the wavelet pipe until the next beginning of active video synch is reached.

The alternative solution is to allow two video fields to overlap in the wavelet pipe. This would have added certain control complexities in dealing with End Of Field conditions. Thus the QCSR level mapper was utilized to provide a means to do the vertical Y edge mirroring processing that needs to occur in non-active parts of the video (bottom edge in encode, top edge in decode).

Main Control Block

Figure 19:
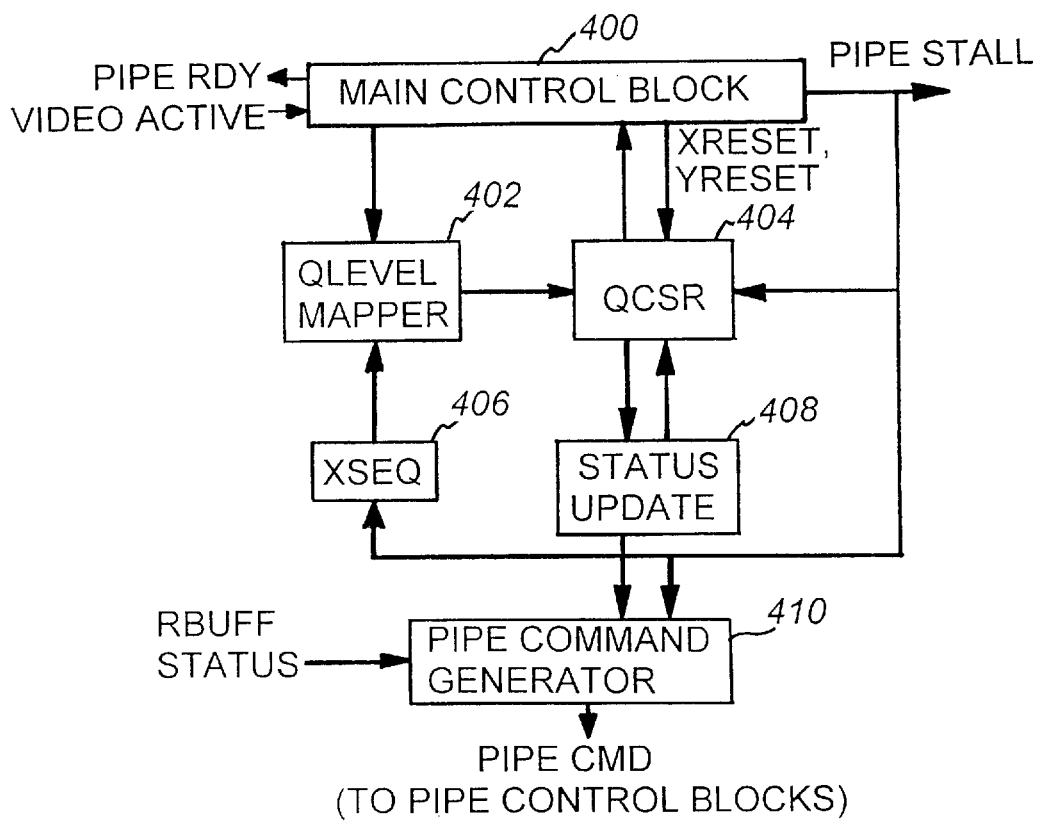
FIG. 19 is a block diagram of the pipe sequencer according to the present invention.

FIG. 19 is a block diagram of the pipe sequencer according to the present invention. As shown, the pipe sequencer includes a main control block 400, a QCSR 404, a Qlevel Mapper is 402, a horizontal X sequencer 406, a status update register 408, and a pipe command generator 410.

Main control block 400 of the pipe sequencer is the high-level control unit that resets the sequencer, and starts the sequencing process as the proper time. It also maintains the Qlevel mapper 402 by providing the level that level 0 maps to (ACTIVE_YLEVEL). The Qlevel mapper 402 can then adjust the maps for all the levels accordingly.

Main control block 400 also generates the PIPE RDY signal described earlier which is used in DECODE to signal the video interface that the wavelet pipe is ready to provide active video. When necessary, this block also can stall the wavelet pipe (usually in DECODE when waiting for the VIDEO ACTIVE signal after PIPE_RDY goes HI).

Performing Wavelet Transform on Two Sequences Using a Single Wavelet Processing Core This section deals specifically with the processing of video chrominance samples. The chrominance samples are provided in two data streams, usually called U and V. These streams, however, are decimated by two from the sampling frequency that luminance uses. Thus, the processing requirement for these two streams is the same as for the luminance stream. It therefore is feasible that they can both be processed using a single wavelet processing core (this core is in addition to the core utilized for luminance).

Also, it can be shown that the vertical Y memory requirement is the same, so long as the blocking structure remains the same. Each component (U or V) is decimated in the horizontal X direction only, in this embodiment. Therefore, the number of columns in each level of their respective wavelet transforms are half that of the luminance component. Together, they require the same vertical Y RAM capacity as does the luminance wavelet pipe. The horizontal X RAM must be doubled since each component must have it's own sample history for all of their respective levels.

The architecture for this pipe is essentially the same as before. The main differences are summarized below:

1. The SEQUENCER runs at half the clock rate, updating the QCSR status every two clock cycles. This allows the SEQUENCER to generate the same command twice, once for U and once for V. In other words, the decision to generate a pipe command is made every other clock cycle, and the command is duplicated for each component. The command for the V component increments the vertical Y RAM address by one, thus assigning odd RAM addresses to V, and even address to U.

2. An extra bit is needed in the PIPE COMMAND that specifies which component is being operated on. This is needed to select memory space that needs to be duplicated for each component.

3. As stated above, the horizontal X sample history RAM needs to have five banks of samples per component, making a total of 10×8×16 bits of RAM.

4. The recursion buffer must be doubled to eight words, four per component.

Otherwise, the design is the same as for the luminance wavelet pipe. Note that the process described will provide outputs (wavelet data in encode, or video data in decode) in the following sequence:

U V  -  -   U V  -  -

The video interface needs the data evenly spread, so a delay register for V was needed to generate the sequence as

U -  V -  U -  V -

The video interface places the luminance data in the other slot for the multiplexed data stream format.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A video compression circuit comprising:
   an input that receives an input video signal;
   a memory buffer, coupled to the input, that temporarily stores a portion of the input video signal;
   a single horizontal filter bank, coupled to the memory buffer, that high-pass and low-pass filters horizontal components of the input video signal; and
   a single vertical filter bank, coupled to the memory buffer, that high-pass and low-pass filters vertical components of the input video signal;
   wherein each of the single horizontal filter bank and single vertical bank analyzes and synthesizes the input video signal.

2. The video compression circuit as claimed in claim 1 wherein each of the single horizontal filter bank and single vertical filter bank performs bi-orthogonal wavelet-based filtering.

3. The video compression circuit claimed in claim 1 further including a recursion buffer, coupled to the horizontal filter bank and the vertical filter bank, that temporarily stores filtered components of the input video signal for recursive filtering.

4. A video compression circuit comprising:
   an input that receives an input video signal;
   a memory buffer, coupled to the input, that temporarily stores a portion of the input video signal;
   a single horizontal filter bank, coupled to the memory buffer, that high-pass and low-pass filters horizontal components of the input video signal;

a single vertical filter bank, coupled to the memory buffer, that high-pass and low-pass filters vertical components of the input video signal;

a recursion buffer, coupled to the horizontal filter bank and the vertical filter bank, that temporarily stores filtered components of the input video signal for recursion filtering; and a wavelet pipe sequencer, coupled to the recursion buffer and the horizontal and vertical filter banks, that controls operation of the filter banks.

5. The video compression circuit claimed in claim 4 wherein the wavelet pipe sequencer includes a quadrant control/status register that stores horizontal and vertical filter control and status bits for each recursive level.

6. The video compression circuit claimed in claim 4 wherein the wavelet pipe sequencer includes a horizontal sequencer that generates a sequence of levels of recursion.

7. The video compression circuit claimed in claim 1 wherein each filter bank receives high-pass and low-pass filter coefficients interleaved with one another.

8. A video compression circuit comprising:

an input that receives an input video signal;

a memory buffer, coupled to the input, that temporarily stores a portion of the input video signal;

a single horizontal filter bank, coupled to the memory buffer, that filters horizontal components of the input video signal;

a single vertical filter bank, coupled to the memory buffer, that filters vertical components of the input video signal;

wherein each of the single horizontal filter bank and single vertical bank analyzes and synthesizes the input video signal; and a recursion buffer, coupled to the filter banks, that temporarily stores filtered components of the input video signal for further filtering.

9. The video compression circuit as claimed in claim 8 wherein each of the single horizontal filter bank and single vertical filter bank performs bi-orthogonal wavelet-based filtering.

10. The video compression circuit as claimed in claim 8 wherein each of the filter banks high-pass and low-pass filters components of the input video signal.

11. A video compression circuit comprising:

an input that receives an input video signal;

a memory buffer, coupled to the input, that temporarily stores a portion of the input video signal;

a single horizontal filter bank, coupled to the memory buffer, that filters horizontal components of the input video signal;

a single vertical filter bank, coupled to the memory buffer, that filters vertical components of the input video signal;

a recursion buffer, coupled to the filter banks, that temporarily stores filtered components of the input video signal for further filtering; and a wavelet pipe sequencer, coupled to the recursion buffer and the horizontal and vertical filter banks, that controls operation of the filter banks.

12. The video compression circuit as claimed in claim 11 wherein the wavelet pipe sequencer includes a quadrant control/status register that stores horizontal and vertical filter control and status bits for each recursive level.

13. The compression circuit as claimed in claim 11 wherein the wavelet pipe sequencer includes a horizontal sequencer that generates a sequence of levels of recursion.

14. A method for compressing an input video signal comprising the steps of:

receiving the input video signal;

storing a portion of the input video signal;

with a single horizontal filter bank, performing analysis and synthesis by high-pass and low-pass filtering horizontal components of the input video signal; and with a single vertical filter bank, performing analysis and synthesis by high-pass and low-pass filtering vertical components of the input video signal.

15. The method as claimed in claim 14 further including a step of recursively filtering filtered components of the input video signal with the horizontal and vertical filter banks.

16. The method as claimed in claim 14 wherein each of the steps of performing includes a step of performing bi-orthogonal wavelet-based filtering.

\* \* \* \* \*

UNITED STATES PATENT AND TRADEMARK OFFICE
CERTIFICATE OF CORRECTION

PATENT NO. : 5,838,377
DATED : November 17, 1998
INVENTOR(S) : Richard Greene

It is certified that error appears in the above-identified patent and that said Letters Patent is hereby corrected as shown below:

Title page, item [54] and col. 1, line 1, replace "COMPRESSED" with -- COMPRESSION--.

Signed and Sealed this

Fourteenth Day of December, 1999

Attest:

Attesting Officer

Q. TODD DICKINSON

Acting Commissioner of Patents and Trademarks